US012807303B2

(12) United States Patent
Echols et al.

(10) Patent No.: US 12,807,303 B2
(45) Date of Patent: Nov. 24, 2026

(54) AIRFOILS AND VEHICLES INCORPORATING THE SAME

(71) Applicant: LeVanta Tech Inc., Springfield, MO (US)

(72) Inventors: Kelly Echols, Monett, MO (US); Randall Petersen, Salt Lake City, UT (US); Aaron Bjelka, Sandy, UT (US); Dawson Wangsgard, Ogden, UT (US); Dylan Lund, Salt Lake City, UT (US); Aaron Fowlks, South Jordan, UT (US)

(73) Assignee: LeVanta Tech Inc., Springfield, MO (US)

(*) Notice: Subject to any disclaimer, the term of this patent is extended or adjusted under 35 U.S.C. 154(b) by 10 days.

(21) Appl. No.: 19/279,550

(22) Filed: Jul. 24, 2025

(65) Prior Publication Data

US 2025/0346344 A1 Nov. 13, 2025

Related U.S. Application Data

(63) Continuation of application No. 18/171,255, filed on Feb. 17, 2023, now abandoned, which is a continuation of application No. PCT/US2021/046767, filed on Aug. 19, 2021.

(60) Provisional application No. 63/175,045, filed on Apr. 14, 2021, provisional application No. 63/067,847, filed on Aug. 19, 2020.

(51) Int. Cl.
*B64C 29/00* (2006.01)
*B64C 9/02* (2006.01)

(52) U.S. Cl.
CPC ............ *B64C 9/02* (2013.01); *B64C 29/0016* (2013.01)

(58) Field of Classification Search
CPC .............................. B64C 9/02; B64C 29/0016
See application file for complete search history.

(56) References Cited

U.S. PATENT DOCUMENTS

| | | | | | |
|---|---|---|---|---|---|
| 2,946,540 | A | * | 7/1960 | Coanda | B64C 21/04 244/15 |
| 3,051,413 | A | * | 8/1962 | Pouit | B64C 23/005 244/12.5 |
| 3,161,377 | A | * | 12/1964 | Balluff | B64C 21/025 244/12.5 |
| 3,361,386 | A | * | 1/1968 | Smith | B64C 23/005 244/207 |
| 4,485,992 | A | | 12/1984 | Rao | |
| 5,255,881 | A | | 10/1993 | Rao | |

(Continued)

FOREIGN PATENT DOCUMENTS

| | | | |
|---|---|---|---|
| CA | 2246723 | A1 | 8/1997 |
| CN | 108725777 | A | 11/2018 |

(Continued)

OTHER PUBLICATIONS

PCT/US21/46767: PCT/ISA/210—International Search Report.

*Primary Examiner* — Tye William Abell
(74) *Attorney, Agent, or Firm* — Caldwell LLC

(57) ABSTRACT

Airfoils and vehicles incorporating the same are disclosed herein. The airfoils include an upper surface and a lower surface. Each airfoil is configured for operative connection to an airframe via the upper surface of the airfoil. Each airfoil includes a channel extending from the upper surface to the lower surface of the airfoil. Each channel is configured for fluidic communication with one or more blowers.

19 Claims, 29 Drawing Sheets

(56) References Cited

U.S. PATENT DOCUMENTS

| | | | |
|---|---|---|---|
| 5,518,204 | A | 5/1996 | Tracy |
| 5,697,468 | A | 12/1997 | Russell, Jr. et al. |
| 5,772,155 | A | 6/1998 | Nowak et al. |
| 6,318,677 | B1 | 11/2001 | Dixon |
| 6,860,449 | B1 * | 3/2005 | Chen ......................... B64B 1/34 244/12.6 |
| 7,032,861 | B2 | 4/2006 | Sanders, Jr. et al. |
| 7,108,230 | B2 | 9/2006 | Clark et al. |
| 7,188,580 | B1 | 3/2007 | Borman |
| 7,249,732 | B2 | 7/2007 | Sanders, Jr. et al. |
| 8,240,616 | B2 | 8/2012 | Miller et al. |
| 8,362,040 | B2 | 1/2013 | Sedrani et al. |
| 8,434,723 | B2 | 5/2013 | Simpson et al. |
| 8,579,227 | B2 | 11/2013 | Burnham |
| 9,694,907 | B2 * | 7/2017 | Simon ................. B64C 29/0025 |
| 9,946,267 | B2 | 4/2018 | Youmans |
| D875,021 | S | 2/2020 | Nunes |
| 10,689,102 | B2 | 6/2020 | Tovkach et al. |
| 10,703,467 | B2 | 7/2020 | Tovkach et al. |
| 10,730,622 | B2 | 8/2020 | Groninga et al. |
| 10,807,656 | B2 | 10/2020 | Preiss et al. |
| 2004/0094662 | A1 | 5/2004 | Sanders et al. |
| 2006/0049304 | A1 | 3/2006 | Sanders et al. |
| 2007/0034738 | A1 | 2/2007 | Sanders et al. |
| 2010/0140389 | A1 | 6/2010 | Gleed et al. |
| 2012/0237341 | A1 * | 9/2012 | Simon ....................... B64C 3/14 415/211.2 |
| 2017/0174335 | A1 | 6/2017 | Malloy |
| 2018/0178907 | A1 | 6/2018 | Tovkach et al. |
| 2018/0272856 | A1 | 9/2018 | Manning |
| 2018/0354609 | A1 | 12/2018 | Renteria |
| 2018/0362160 | A1 | 12/2018 | Groninga et al. |
| 2019/0016453 | A1 * | 1/2019 | Skulskis ................. B64C 11/46 |
| 2019/0023389 | A1 * | 1/2019 | Murrow .............. B64C 29/0025 |
| 2019/0121371 | A1 | 4/2019 | Russell |
| 2019/0168866 | A1 | 6/2019 | Tovkach et al. |
| 2019/0256200 | A1 | 8/2019 | Neff |
| 2019/0302802 | A1 | 10/2019 | Misfeldt |
| 2019/0302803 | A1 | 10/2019 | Misfeldt |
| 2020/0062392 | A1 | 2/2020 | Yoon |
| 2020/0064443 | A1 | 2/2020 | Yoon |

FOREIGN PATENT DOCUMENTS

| | | | |
|---|---|---|---|
| CN | 110341933 | A | 10/2019 |
| DE | 10331661 | A1 | 1/2005 |
| DE | 202018104519 | U1 | 9/2019 |
| DE | 102018113265 | A1 | 12/2019 |
| EP | 3492377 | A1 | 6/2019 |
| EP | 3415423 | B1 | 11/2019 |
| GB | 2347909 | A | 9/2000 |
| WO | 1997030886 | A1 | 8/1997 |
| WO | 2004065208 | A2 | 8/2004 |
| WO | 2005072233 | A2 | 8/2005 |
| WO | 2015145101 | A1 | 10/2015 |
| WO | 2016022040 | A1 | 2/2016 |
| WO | 2017030462 | A1 | 2/2017 |
| WO | 2017049135 | A1 | 3/2017 |
| WO | 2017173159 | A1 | 10/2017 |
| WO | 2018021943 | A1 | 2/2018 |
| WO | 2018196041 | A1 | 11/2018 |
| WO | 2019244892 | A1 | 12/2019 |
| WO | 2019244893 | A1 | 12/2019 |
| WO | 2020031511 | A1 | 2/2020 |
| WO | 2022040463 | A1 | 2/2022 |

* cited by examiner

| Angle of Attack | Fan Speed | 60 Hz | 55 Hz | 50 Hz |
|---|---|---|---|---|
| | Actual Air Speed | 32.7 | 29.83 | 26.88 |
| | Similitude Air Speed | 4.67 | 4.26 | 3.84 |
| 0 | Lift (kg*f) | 0.33 | 0.27 | 0.23 |
| | Lift (N) | 3.19 | 2.6 | 2.26 |
| | Simulation Lift (N) | 3.08 | 2.56 | 2.07 |
| | error | 3.49% | 1.68% | 8.17% |
| | Drag (kg*f) | 0.09 | 0.072 | 0.055 |
| | Drag (N) | 0.88 | 0.71 | 0.54 |
| 4 | Lift (kg*f) | 0.48 | 0.39 | 0.31 |
| | Lift (N) | 4.66 | 3.83 | 3.04 |
| | Simulation Lift (N) | 4.12 | 3.42 | 2.77 |
| | error | 11.67% | 10.66% | 8.91% |
| | Drag (kg*f) | 0.13 | 0.102 | 0.078 |
| | Drag (N) | 1.28 | 1 | 0.77 |
| 8 | Lift (kg*f) | 0.6 | 0.5 | 0.41 |
| | Lift (N) | 5.92 | 4.91 | 3.97 |
| | Simulation Lift (N) | 5.17 | 4.29 | 3.49 |
| | error | 12.58% | 12.52% | 12.28% |
| | Drag (kg*f) | 0.18 | 0.142 | 0.11 |
| | Drag (N) | 1.77 | 1.39 | 1.08 |
| 12 | Lift (kg*f) | 0.71 | 0.6 | 0.49 |
| | Lift (N) | 6.97 | 5.89 | 4.76 |
| | Simulation Lift (N) | 6.15 | 5.11 | 4.15 |
| | error | 11.75% | 13.20% | 12.86% |
| | Drag (kg*f) | 0.236 | 0.193 | 0.15 |
| | Drag (N) | 2.32 | 1.89 | 1.47 |
| 16 | Lift (kg*f) | 0.83 | 0.7 | 0.57 |
| | Lift (N) | 8.09 | 6.82 | 5.55 |
| | Simulation Lift (N) | 7.06 | 5.87 | 4.76 |
| | error | 12.72% | 13.92% | 14.34% |
| | Drag (kg*f) | 0.313 | 0.256 | 0.204 |
| | Drag (N) | 3.07 | 2.51 | 2 |
| 20 | Lift (kg*f) | 0.86 | 0.71 | 0.53 |
| | Lift (N) | 8.42 | 6.92 | 5.23 |
| | Simulation Lift (N) | 7.67 | 6.37 | 5.17 |
| | error | 8.91% | 7.88% | 1.05% |
| | Drag (kg*f) | 0.381 | 0.315 | 0.253 |
| | Drag (N) | 3.74 | 3.09 | 2.48 |

Fig. 26

AIRFOILS AND VEHICLES INCORPORATING THE SAME

CROSS-REFERENCE TO RELATED APPLICATIONS

This application is a continuation of U.S. Nonprovisional application Ser. No. 18/171,255, filed on Feb. 17, 2023, and entitled "AIRFOILS AND VEHICLES INCORPORATING THE SAME", which is a continuation of International Patent Application No. PCT/US2021/046767, filed on Aug. 19, 2021, and entitled "AIRFOILS AND VEHICLES INCORPORATING THE SAME", which claims priority to U.S. Provisional Patent Application No. 63/175,045, filed on Apr. 14, 2021, and entitled "AIRFOILS AND VEHICLES INCORPORATING THE SAME", and to U.S. Provisional Patent Application No. 63/067,847, filed on Aug. 19, 2020, and entitled "AIRFOILS AND VEHICLES INCORPORATING THE SAME", the contents of all of which are incorporated herein by reference in their entirety.

COPYRIGHT NOTICE

© 2023 Levanta Tech LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

FIELD OF THE INVENTION

The present disclosure relates to aerospace technology, in particular to airfoils and vehicles incorporating the same.

BACKGROUND

Rotary-wing aircraft, such as the quadcopters commonly used as drones, have the benefit of vertical take-off and landing (VTOL); however, they tend to have limited range due to inefficiencies associated with horizontal movement. Fixed wing aircraft are more efficient at horizontal movement and tend to have better range and speed than rotary-wing aircraft. However, fixed-wing aircraft typically need runways for take-off and landing.

SUMMARY OF THE DISCLOSURE

In an aspect, a vehicle includes an airframe operatively connected to one or more blowers, and a plurality of airfoils, wherein each airfoil comprises a leading edge, a trailing edge, an upper surface and a lower surface extending laterally to first and second arcuate wingtips defining a concave region bounded by the lower surface of the airfoil, each airfoil is operatively connected to the airframe via the upper surface of each airfoil, each airfoil comprises a channel extending from the upper surface to the lower surface of the airfoil, the channel is in fluidic communication with at least one of the one or more blowers, and the leading edge is longer than the trailing edge.

In another aspect, an airfoil includes a leading edge, a trailing edge an upper surface and a lower surface extending laterally to first and second arcuate wingtips defining a concave region bounded by the lower surface of the airfoil, the airfoil configured for operative connection to an airframe via the upper surface of the airfoil, the airfoil comprising a channel extending through the upper surface and the lower surface of the airfoil, wherein an upper orifice of the channel is configured for fluidic communication with one or more blowers and the leading edge is longer than the trailing edge.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

Non-limiting embodiments of the present disclosure are illustrated in the accompanying drawings, in which:

FIG. 26 depicts wind tunnel data for an embodiment of the airfoil disclosed herein.

DETAILED DESCRIPTION

Figure 1:
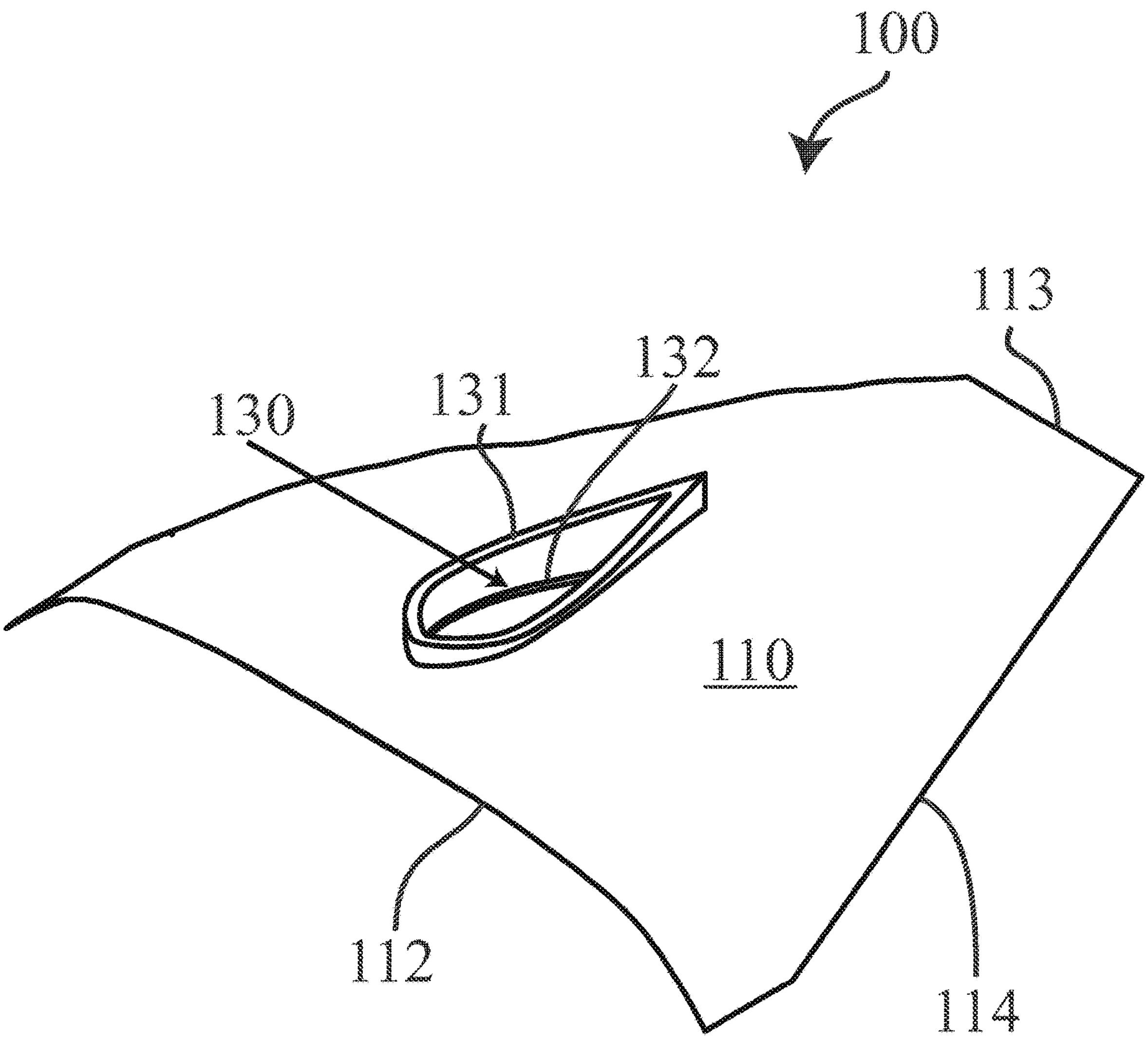
FIG. 1 illustrates a perspective view of one embodiment of an airfoil disclosed herein, airfoil 100.

Disclosed herein are airfoils and vehicles incorporating the same.

The airfoils disclosed herein can be used for hovering, ground effect flight, and flight above ground effect. The airfoils utilize blown air (or another fluid, such as an exhaust gas) for hovering. As forward movement is engaged, the airfoil design provides lift. In certain embodiments, the blown air can be turned off or directed elsewhere, when sufficient forward speeds are achieved to provide all of the necessary lift. Vehicles incorporating the airfoils disclosed herein can approach the efficiencies and range of fixed wing aircraft (or perhaps exceed those efficiencies when flying in ground effect), but with instantaneous hover capability, removing the need for a runway.

The phrases "operably connected to," "connected to," "coupled to," "operatively connected," or "operative connection" refer to any form of interaction between two or more entities, including mechanical, electrical, magnetic, electromagnetic, fluid, and thermal interaction. Likewise, "fluidically connected to" or "fluidically connecting" refers to any form of fluidic interaction between two or more entities. Two entities may interact with each other even though they are not in direct contact with each other. For example, two entities may interact with each other through an intermediate entity.

The term "proximal" is used herein to refer to "near" or "at" the object disclosed.

The airfoil has an upper surface and a lower surface and is configured for operative connection to an airframe via the upper surface of the airfoil. The airfoil has a channel extending from the upper surface to the lower surface of the airfoil, wherein the channel is configured for fluidic communication with one or more blowers. The upper surface and the lower surface preferably extend laterally to first and second arcuate wingtips defining a concave region bounded by the lower surface of the airfoil. The airfoil may include a nozzle extending downward from the lower surface of the airfoil in fluidic communication with the channel of the airfoil. The nozzle may be extendable and retractable.

Vehicles including the airfoils may have an airframe operatively connected to one or more blowers. Fluid provided by the one or more blowers into the channels of each of the airfoils generates lift for the vehicles. In particular, the blowers may supply fluid with sufficient pressure to facilitate hover of the vehicles.

The channel may include a straight tube. Alternatively, the channel includes a swept tube wherein a lower orifice of the channel is offset relative to an upper orifice of the channel.

The airfoil can include a selectively openable vent located in the upper surface of the airfoil and rearward of an upper orifice of the channel and wherein the vent is in fluidic communication with the channel, whereby when the vent is in an open position, fluid provided into the channels exits at least partially through the vent and over the upper surface of the airfoil.

In some embodiments, a centerline of the airfoil has a stationary angle of attack of 5° to 25°, of 5° to 20°, of 5° to 15°, of 10° to 20°, or of 10° to 15°. In contrast, the first and second arcuate wingtips may have a stationary angle of attack of zero or near zero.

Methods of hovering a vehicle are also disclosed herein. The methods include providing multiple airfoils operably connected to an airframe of a vehicle, wherein each airfoil comprises an upper surface and a lower surface extending laterally to first and second arcuate wingtips defining a concave region bounded by the lower surface of the airfoil. Each airfoil is configured for operative connection to the airframe via the upper surface of the airfoil. The airfoil includes a channel extending through the upper surface and the lower surface of the airfoil, wherein an upper orifice of the channel is configured for fluidic communication with one or more blowers. Blowing via the one or more blowers a fluid through the channel with sufficient volume and pressure to lift the vehicle off of a surface. The airfoil is designed such that moving the vehicle forward directs atmospheric air over and under each of the airfoils and provides additional lift for the vehicle.

Figure 2:
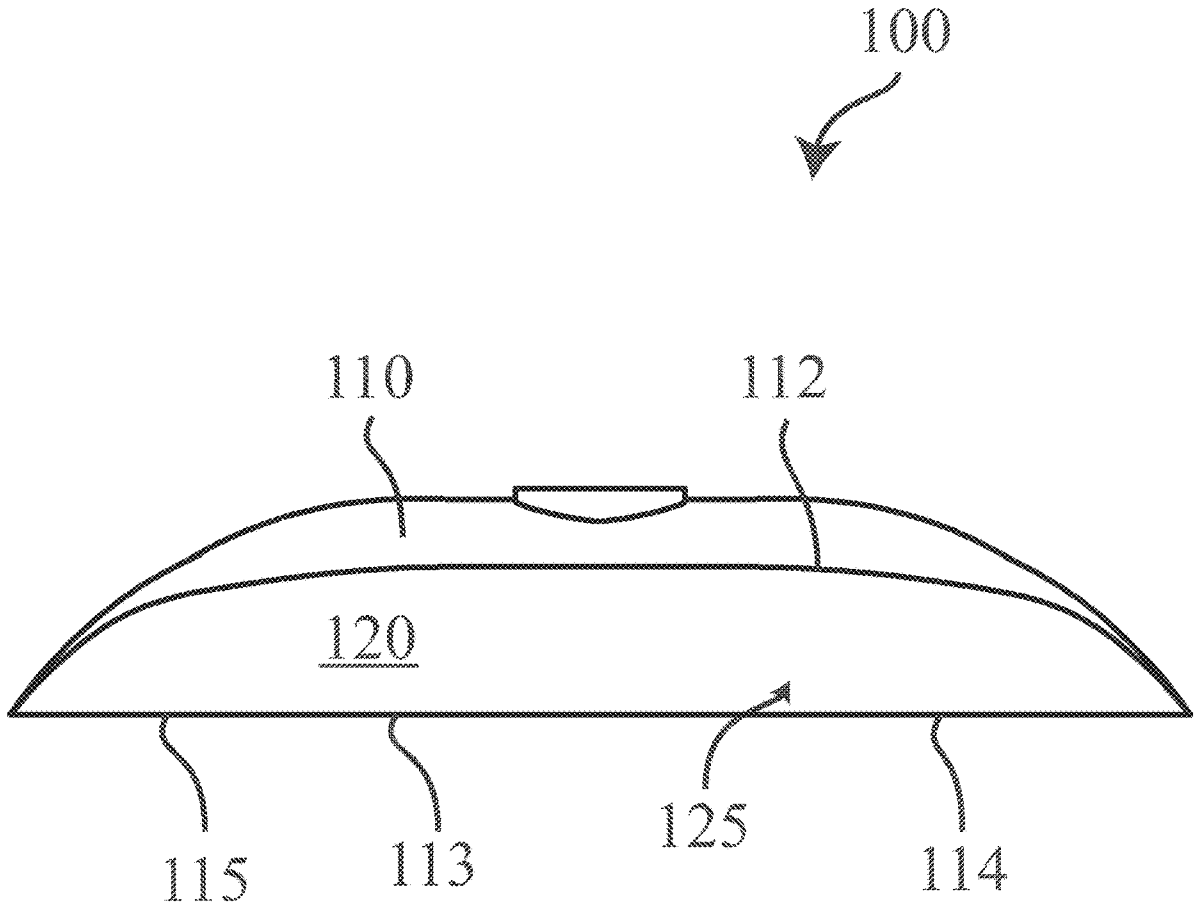
FIG. 2 illustrates a front view of the airfoil 100.
Figure 3:
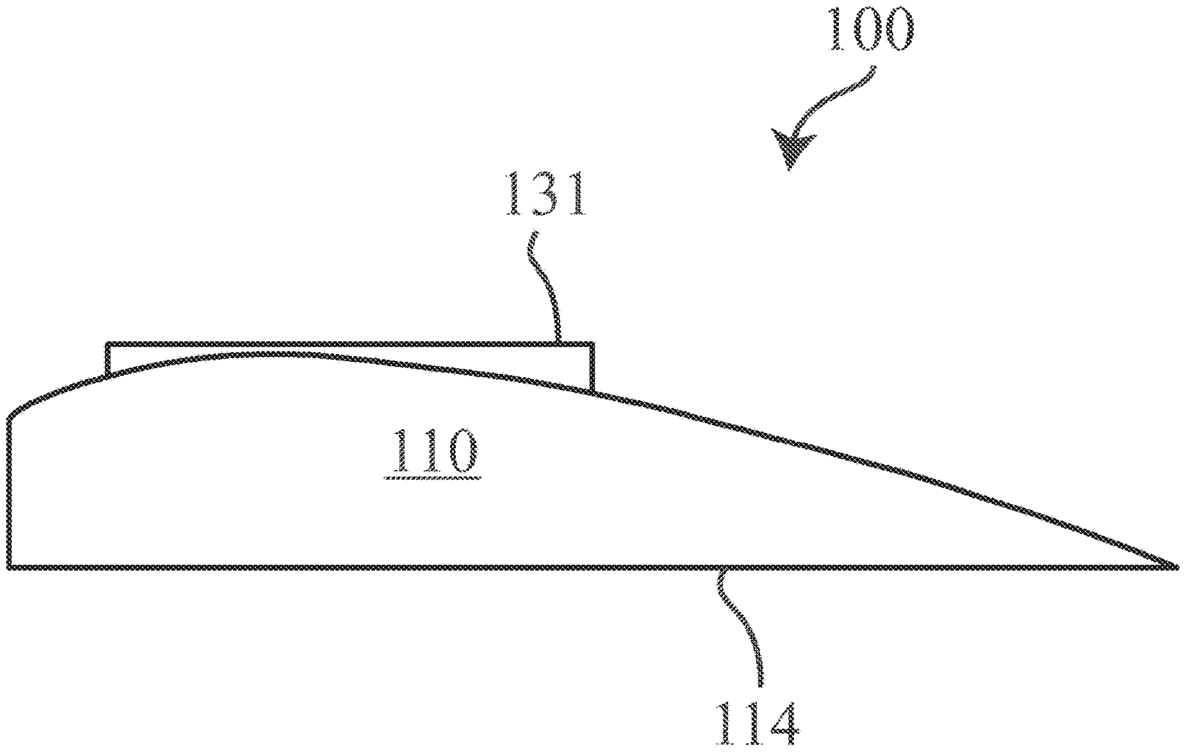
FIG. 3 illustrates a side view of the airfoil 100.
Figure 4:
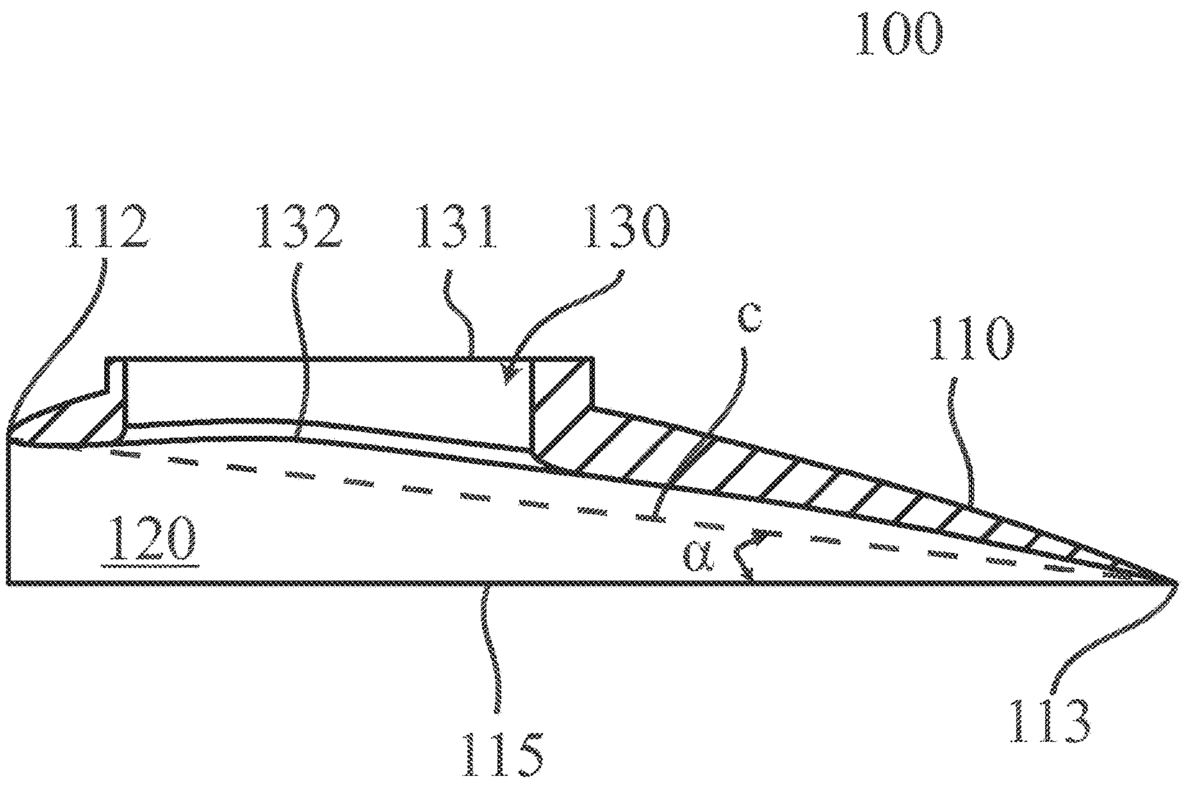
FIG. 4 illustrates a cross-sectional side view of the airfoil 100 taken along the lateral centerline of the airfoil 100.
Figure 5:
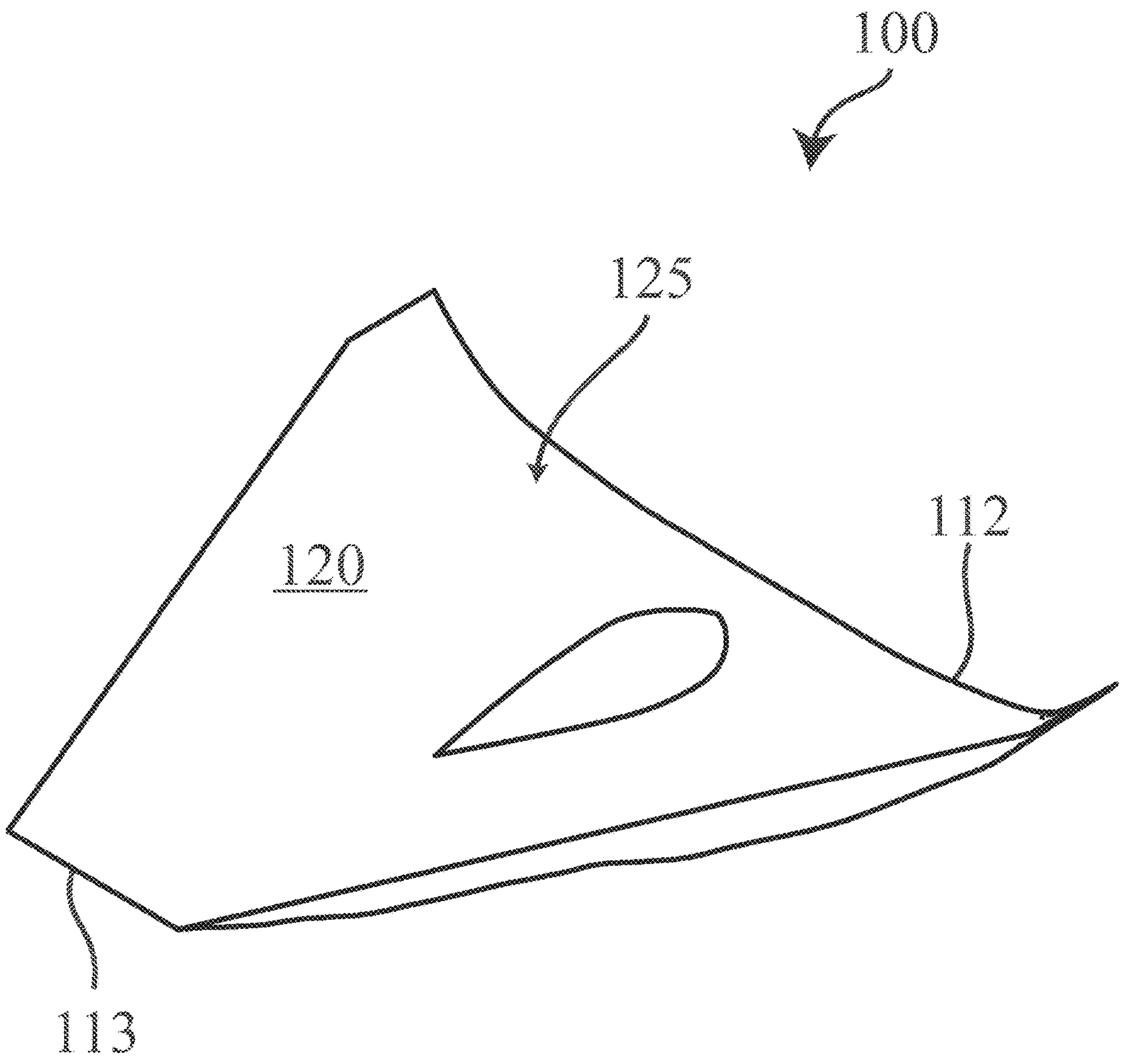
FIG. 5 illustrates an underneath perspective view of the airfoil 100.

FIG. 1 illustrates a perspective view of one embodiment of an airfoil disclosed herein, airfoil 100. FIG. 2 illustrates a front view of the airfoil 100. FIG. 3 illustrates a side view of the airfoil 100. FIG. 4 illustrates a cross-sectional side view of the airfoil 100 taken along the centerline of the airfoil 100. FIG. 5 illustrates an underneath perspective view of the airfoil 100.

The airfoil 100 has an upper surface 110 and a lower surface 120 and is configured for operative connection to an airframe via the upper surface 110 of the airfoil 100. The airfoil 100 has a channel 130 extending from the upper orifice 131 in the upper surface 110 to the lower orifice 131 in the lower surface 120 of the airfoil 100. The channel 130 is configured for fluidic communication with one or more blowers. For example, fresh air or exhaust gas supplied by blowers may be blown through the channel 130.

The upper surface 110 and the lower surface 120 extend laterally to first arcuate wingtip 114 and second arcuate wingtip 115. The camber of the airfoil 100 from the leading edge 112 to the trailing edge 113 combined with the curvature of the first and second arcuate wingtips 114 and 115, defines a concave region 125 bounded by the lower surface 120 of the airfoil 100.

In the airfoil 100, the upper orifice 131 protrudes upwards from the upper surface 110. In other variations, the upper orifice 131 may be flush with the upper surface 110. The upper orifice may be operably connected to an airframe and/or a blower via a flange, a rigid aerotube (i.e., aerodynamic structural tube that both provides mechanical attachment to the airframe and fluidic connection with the blower), flexible tubing, or other structure for conveying fluid from a blower to the channel 130.

In the airfoil 100, the channel 130 is a straight tube.

As can be seen in FIG. 4, the centerline of the airfoil 100 has a stationary angle of attack of 7° (i.e., alpha equals 7°). The stationary angle of attack refers to the angle of attack of the airfoil when the airfoil is not moving, such as when an aircraft utilizing the airfoil is stationary. The angle of attack is the angle of imaginary line "c," the "chord line," extending from the leading edge 112 to the trailing edge 113 relative to horizontal. For the airfoil 100, the first and second arcuate wingtips 114 and 115 have a stationary angle of attack of zero. Or stated another way, the edges of the first and second arcuate wingtips 114 and 115 are horizontal when a vehicle utilizing the airfoil is stationary.

In the airfoil 100, the trailing edge 113 and the first and second arcuate wingtips 114 and 115 are separate edges that join at points. Alternatively, the trailing edge 113 can extend smoothly and continuously to the leading edge 112, such as in a continuous arc. This applies to all of the airfoil embodiments disclosed herein.

Fluid can be supplied through the channel 130 with sufficient volume and pressure to lift the airfoil 100 (and a vehicle attached thereto) off the surface. Additionally, as fluid exits the channel 130 and the airfoil 100 elevates, at least a portion of the fluid may accumulate in the concave region 125 and aid a pressure build up under the airfoil 100.

As the airfoil 100 moves forward (or air is otherwise horizontally directed against the airfoil 100), air is directed by "ram effect" into the concave region 125. Without wishing to be bound by theory, it is believed that at zero or low forward velocity, the airfoil 100 will hover over the surface and ride on a cushion of fluid supplied by the blowers through the channel 130. As the forward velocity increases, volume of fluid supplied through the channel 130 can be reduced. Additionally, as forward velocity increases, the airfoil 100 can transition from hover to flight.

Figure 6:
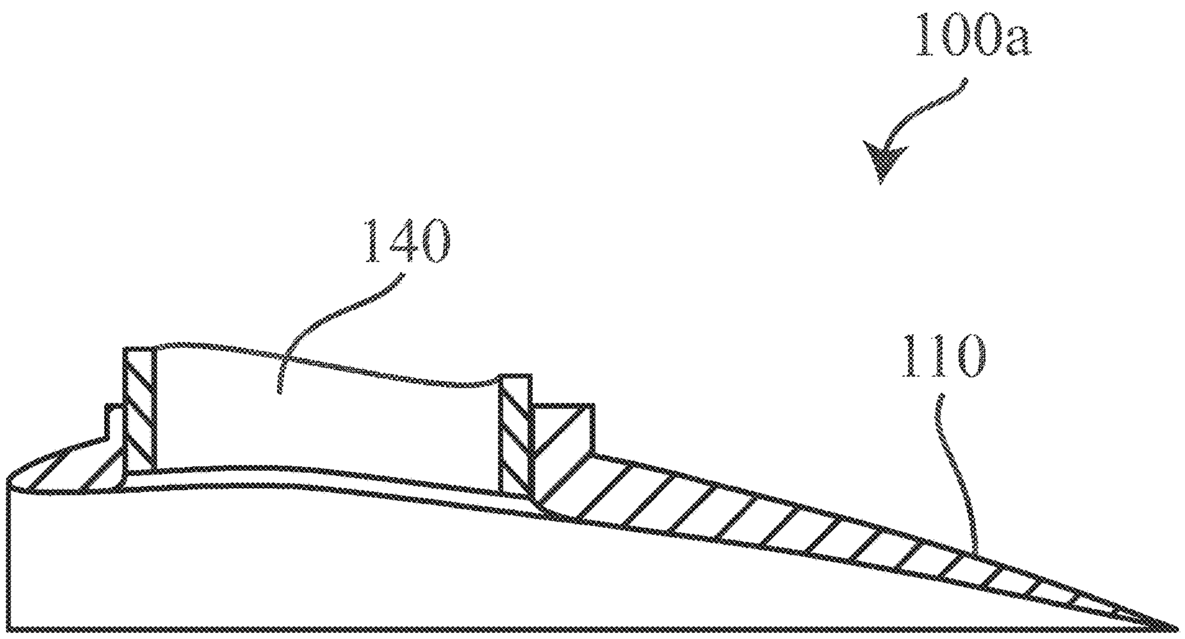
FIG. 6 illustrates a lateral centerline cross-sectional view of a variation of the airfoil 100.
Figure 7:
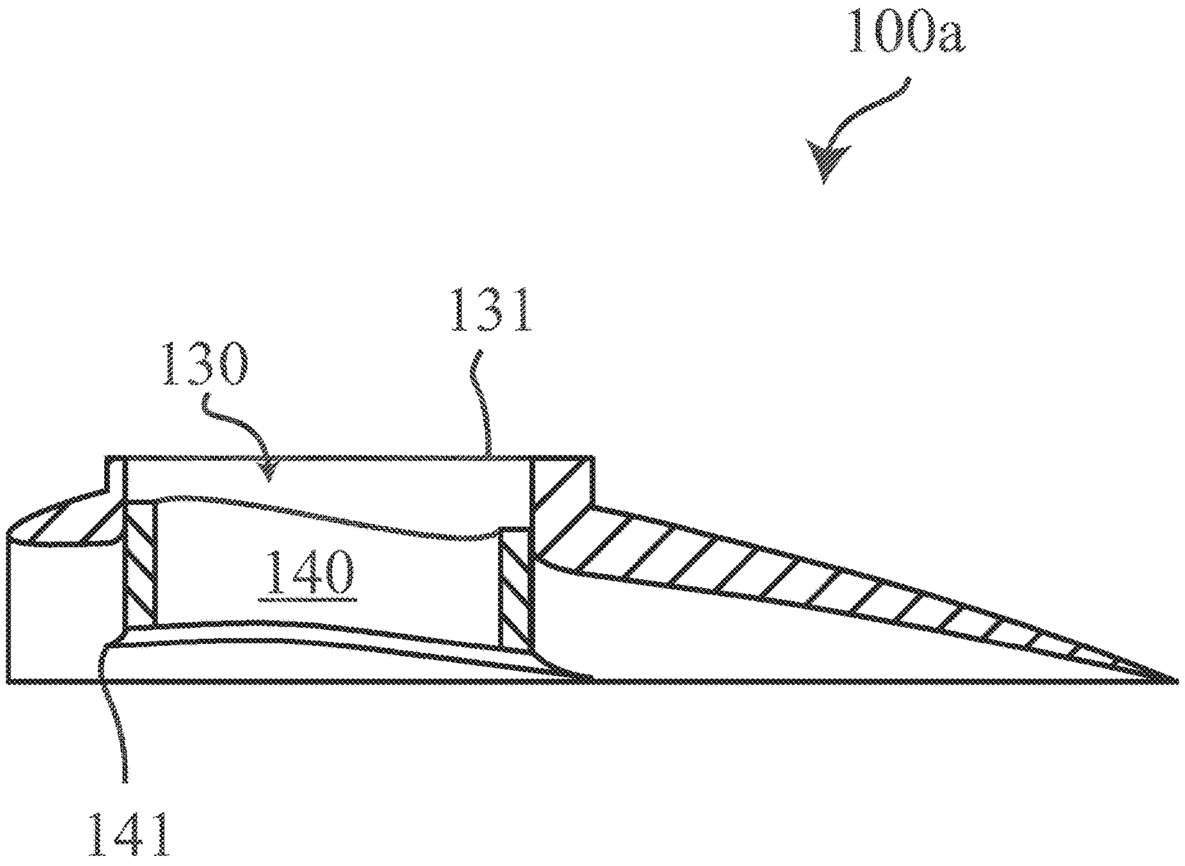
FIG. 7 illustrates a lateral centerline cross-sectional view of the airfoil 100*a* depicting the nozzle 140 extended from within the channel 130.
Figure 8:
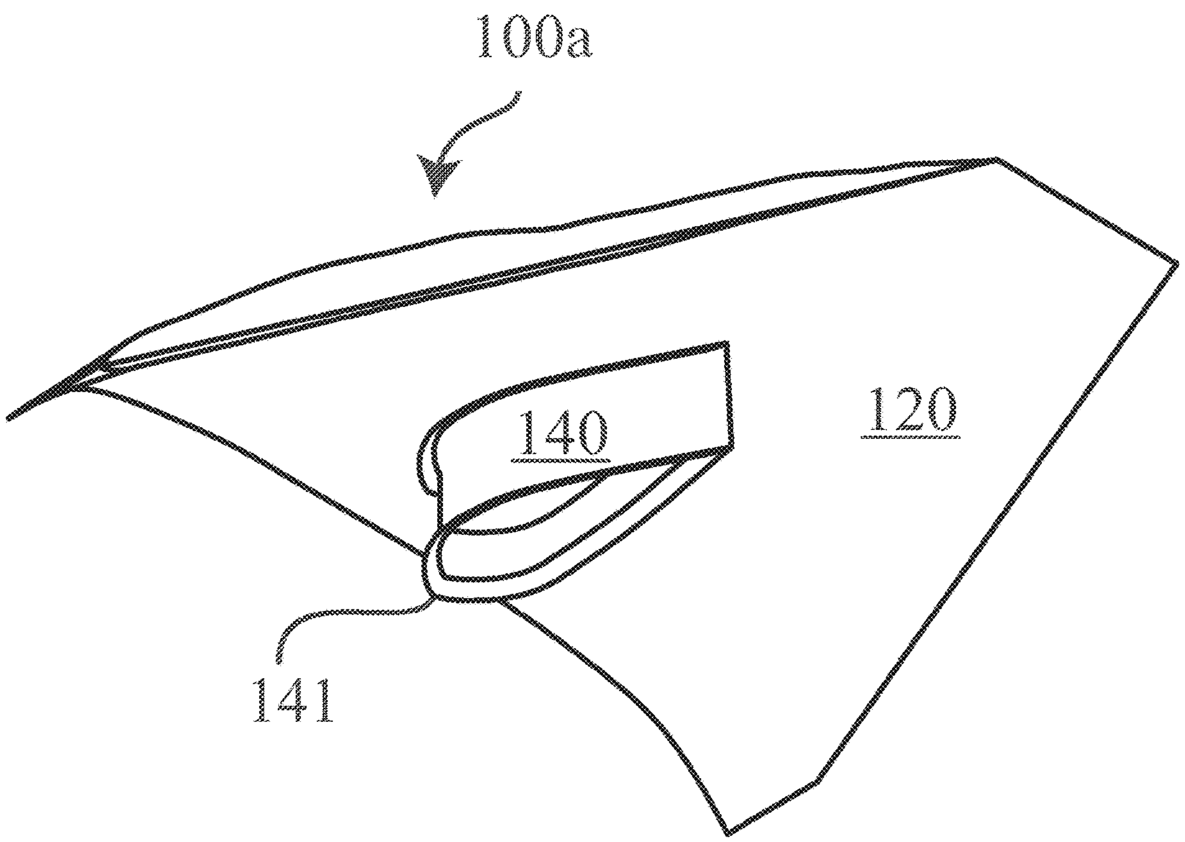
FIG. 8 illustrates an underneath perspective view of the airfoil 100*a* with the nozzle 140 extended.

FIGS. 6-8 illustrate a variation of the airfoil 100, airfoil 100*a*. Airfoil 100*a* includes an extendable and retractable nozzle 140. FIG. 6 illustrates a centerline cross-sectional view of the airfoil 100*a* depicting the nozzle 140 retracted within the channel 130. FIG. 7 illustrates a centerline cross-sectional view of the airfoil 100*a* depicting the nozzle 140 extended from within the channel 130. FIG. 8 illustrates an underneath perspective view of the airfoil 100*a* with the nozzle 140 extended.

In the airfoil 100*a*, the nozzle 140 extends close to the horizontal plane defined by the trailing edge 113 and the first and second arcuate wingtips 114 and 115. Alternatively, the nozzle 140 can be flush with the plane defined by those edges or it can extend beyond those edges. The nozzle 140 can direct fluid from one or more blowers towards a surface (such as the ground, water, or other takeoff surface). The nozzle 140 directs fluid from the channel 130 in close proximity to the surface. This may reduce the volume and/or pressure of the fluid needed to achieve hover.

As forward velocity increases, the nozzle 140 can be retracted and the airfoil 100*a* function the same as the airfoil 100. Alternatively, in other embodiments, the nozzle 140 is permanently extended.

In the airfoil 100*a*, the nozzle 140 includes a foot 141 at the end of the nozzle 140. The illustrated foot 141 aligns the end of the nozzle 140 with the lower surface 120. The illustrated nozzle 140 is an open tube and the foot 141 surrounds the perimeter. The foot 141 provides increased surface area proximal the end of the nozzle 140.

Instead of an open tube, the nozzle 140 and the foot 141 can be capped off. Fluid could be discharged from slits, holes, or other apertures in the underside of the foot 141. The foot 141 could be made of a flexible material that inflates with fluid blown through the nozzle 140 and deflates when fluid is not pushed into it.

The concept of the nozzle 140 and optionally the foot 141 can be used with any of the embodiments disclosed herein.

Figure 9:
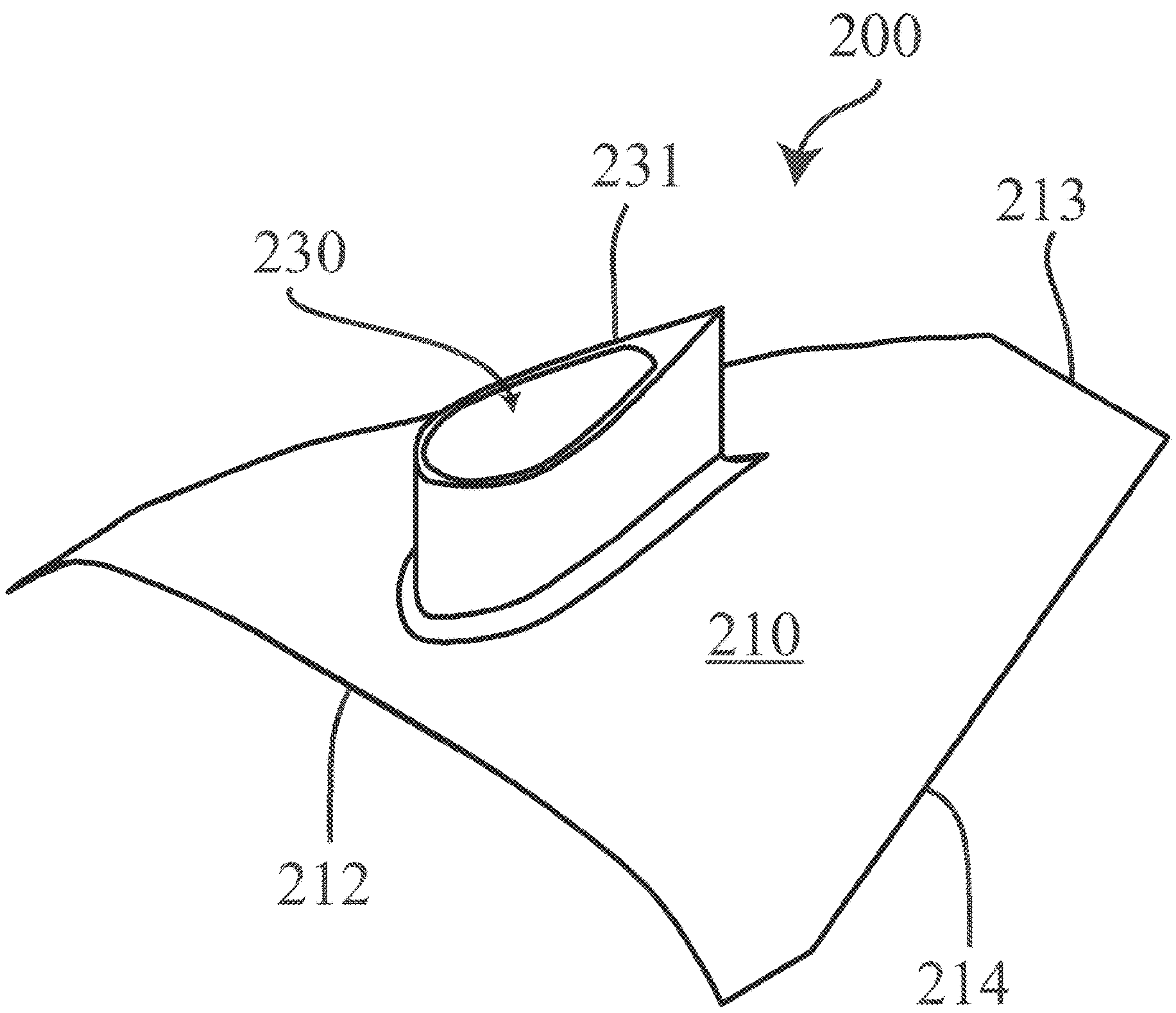
FIG. 9 illustrates a perspective view of one embodiment of an airfoil disclosed herein, airfoil 200.
Figure 10:
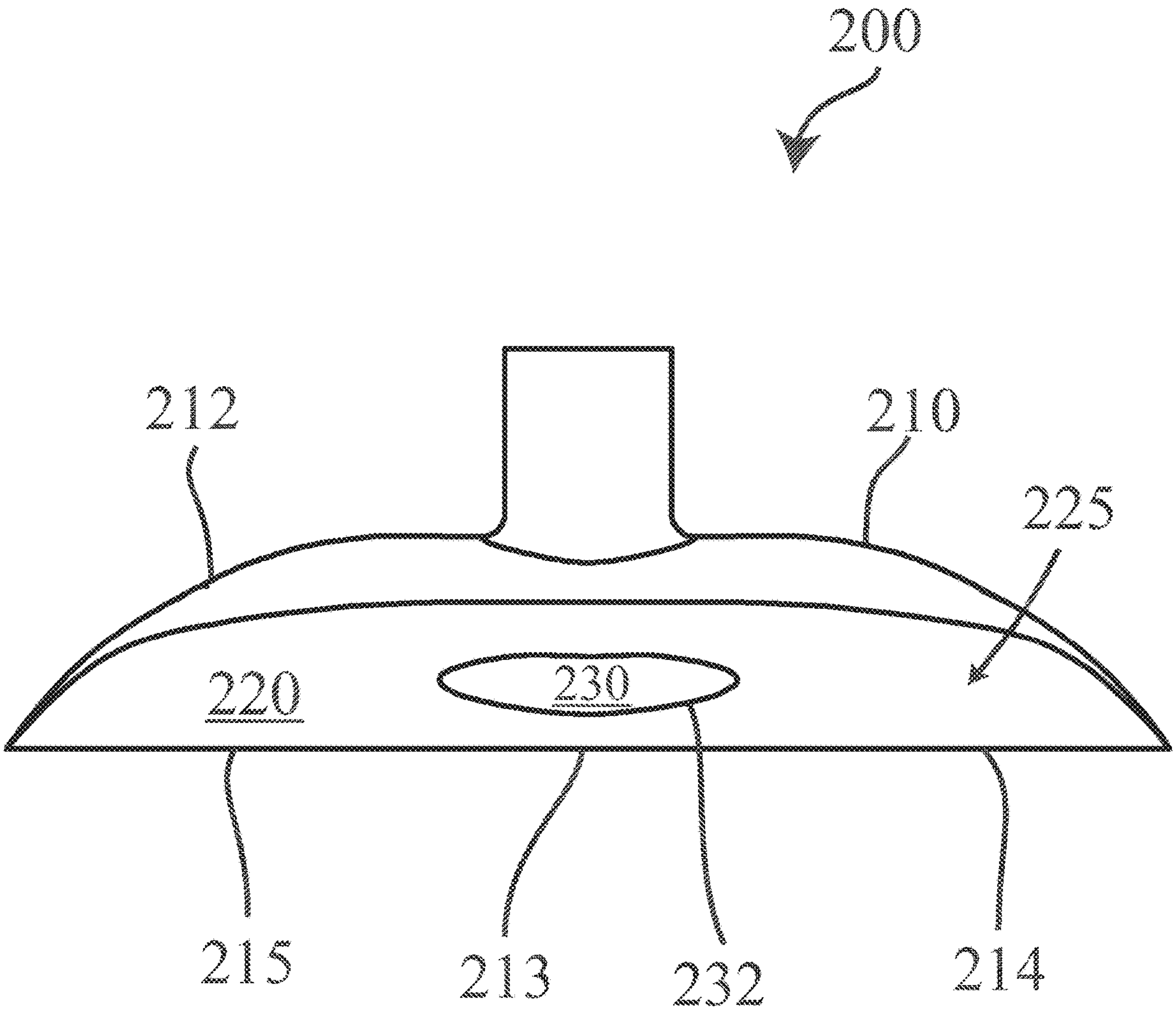
FIG. 10 illustrates a front view of the airfoil 200.
Figure 11:
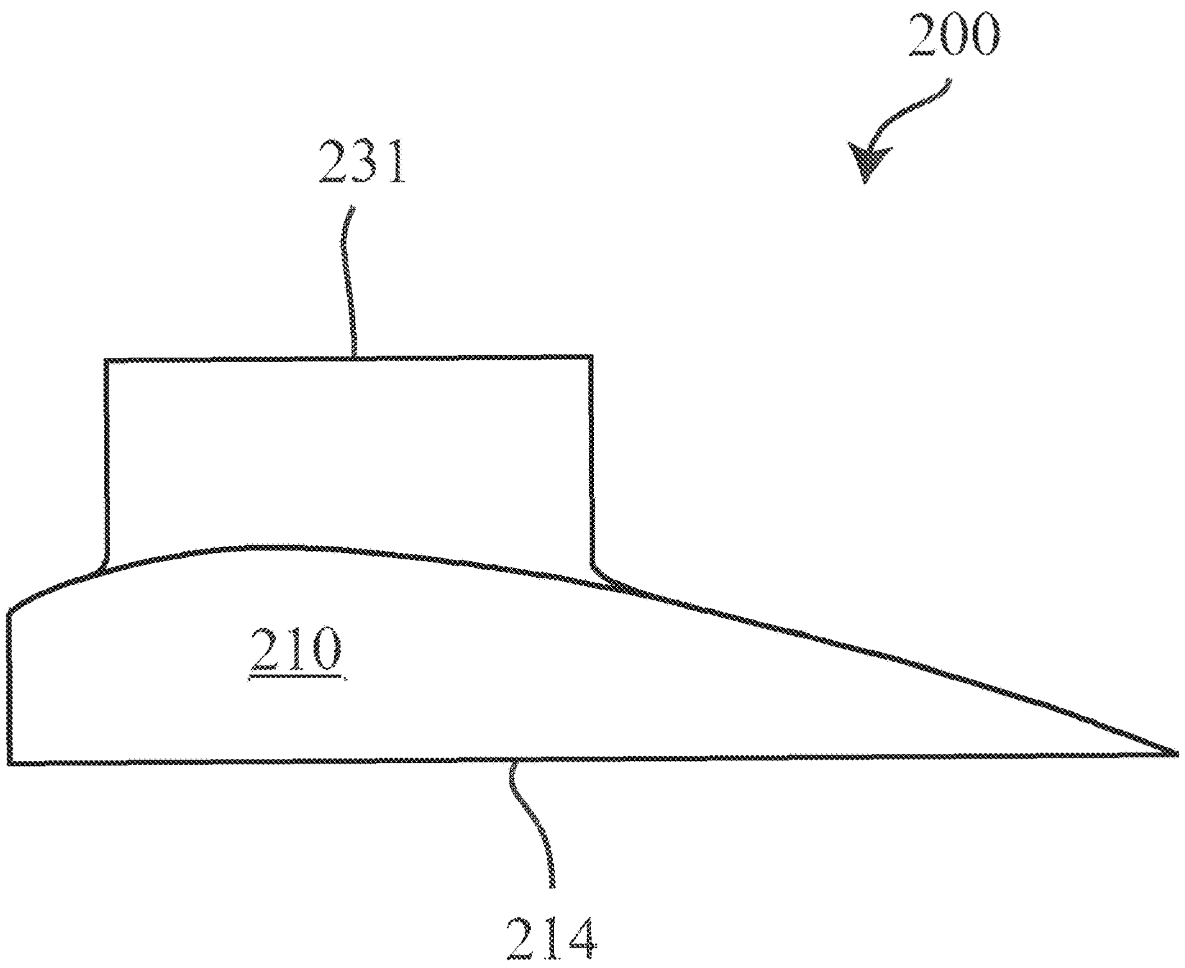
FIG. 11 illustrates a side view of the airfoil 200.
Figure 12:
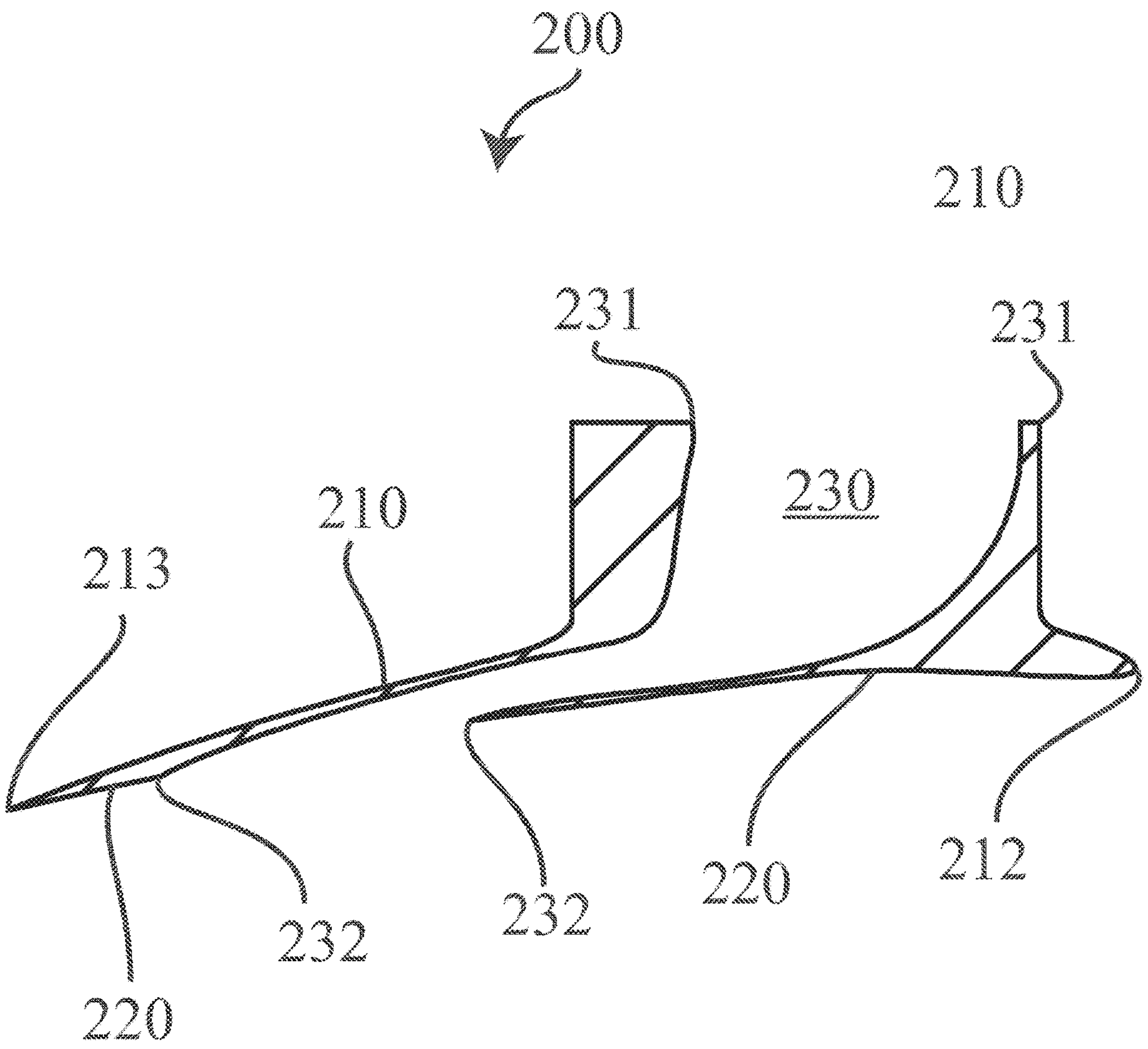
FIG. 12 illustrates a cross-sectional slice of the airfoil 200 taken along the lateral centerline of the airfoil 200.
Figure 13:
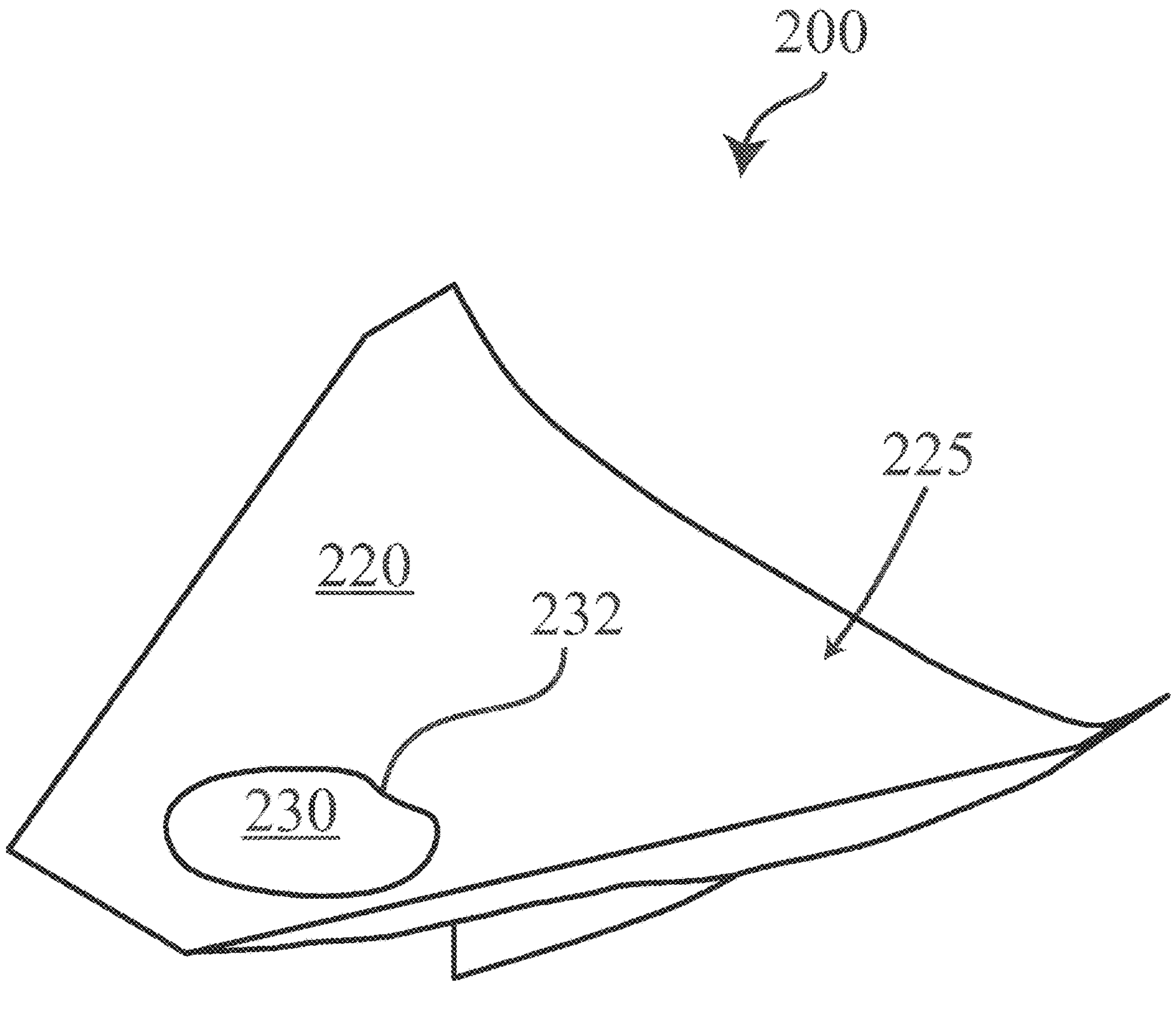
FIG. 13 illustrates an underneath perspective view of the airfoil 200.

FIG. 9 illustrates a perspective view of one embodiment of an airfoil disclosed herein, airfoil 200. FIG. 10 illustrates a front view of the airfoil 200. FIG. 11 illustrates a side view of the airfoil 200. FIG. 12 illustrates a cross-sectional slice of the airfoil 200 taken along the centerline of the airfoil 200. FIG. 13 illustrates an underneath perspective view of the airfoil 200.

The airfoil 200 has an upper surface 210 and a lower surface 220 and is configured for operative connection to an airframe via the upper surface 210 of the airfoil 200. The airfoil 200 has a channel 230 extending from the upper orifice 231 in the upper surface 210 to the lower orifice 231 in the lower surface 220 of the airfoil 200. The channel 230 is configured for fluidic communication with one or more blowers. For example, fresh air or exhaust gas supplied by blowers may be blown through the channel 230.

The upper surface 210 and the lower surface 220 extend laterally to first arcuate wingtip 214 and second arcuate wingtip 215. The camber of the airfoil 200 from the leading edge 212 to the trailing edge 213 combined with the curvature of the first and second arcuate wingtips 214 and 215, defines a concave region 225 bounded by the lower surface 220 of the airfoil 200.

In the airfoil 200, the upper orifice 231 protrudes upwards from the upper surface 210. In other variations, the upper orifice 231 may be flush with the upper surface 210. The upper orifice may be operably connected to an airframe and/or a blower via a flange, a rigid aerotube (i.e., aerodynamic structural tube that both provides mechanical attachment to the airframe and fluidic connection with the blower), flexible tubing, or other structure for conveying fluid from a blower to the channel 230.

In the airfoil 100, the channel 230 is a swept tube. The lower orifice 232 of the channel 230 is offset relative to the upper orifice 231.

The centerline of the airfoil 200 has a stationary angle of attack of 7°. For the airfoil 200, the first and second arcuate wingtips 214 and 215 have a stationary angle of attack of zero. Or stated another way, the edges of the first and second arcuate wingtips 214 and 215 are horizontal when a vehicle utilizing the airfoil is stationary. In the airfoil 200, the trailing edge 213 and the first and second arcuate wingtips 214 and 215 are separate edges that join at points. Alternatively, the trailing edge 213 can extend smoothly and continuously to the leading edge 212, such as in a continuous arc.

Fluid can be supplied through the channel 230 with sufficient volume and pressure to lift the airfoil 200 (and a vehicle attached thereto) off a surface. Additionally, as fluid exits the channel 230 and the airfoil 200 elevates, at least a portion of the fluid may accumulate in the concave region 225 and aid a pressure build up under the airfoil 200.

As the airfoil 200 moves forward (or air is otherwise horizontally directed against the airfoil 200), air is directed by "ram effect" into the concave region 225. Without wishing to be bound by theory, it is believed that at zero or low forward velocity, the airfoil 200 will hover over the surface and ride on a cushion of fluid supplied by the blowers through the channel 230. As the forward velocity increases, volume of fluid supplied through the channel 230 can be reduced. Additionally, as forward velocity increases, the airfoil 200 can transition from hover to flight.

Figure 14:
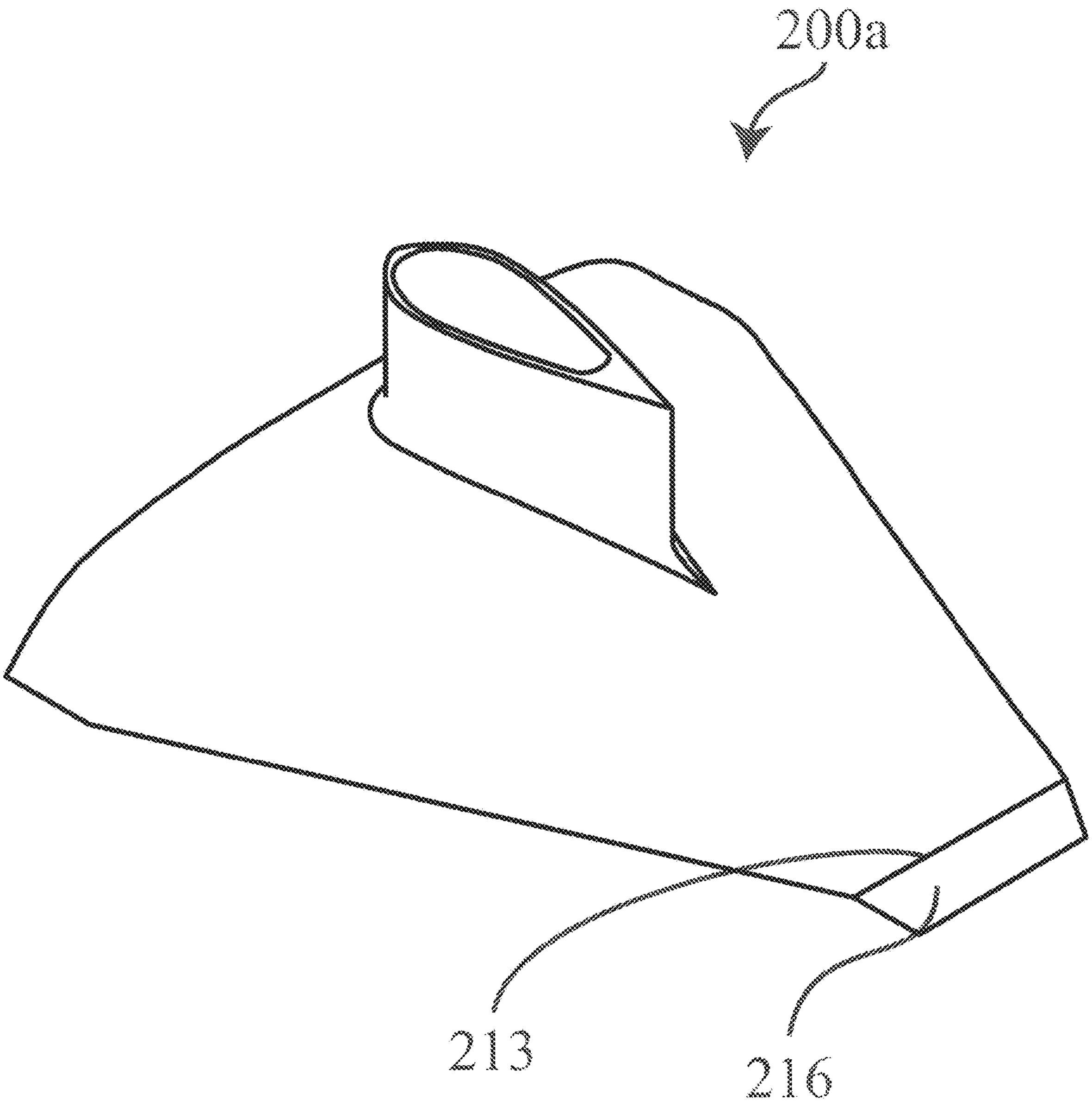
FIG. 14 illustrates a perspective view of a variation of the airfoil 200, the airfoil 200*a*, with the flap 216 downward oriented.
Figure 15:
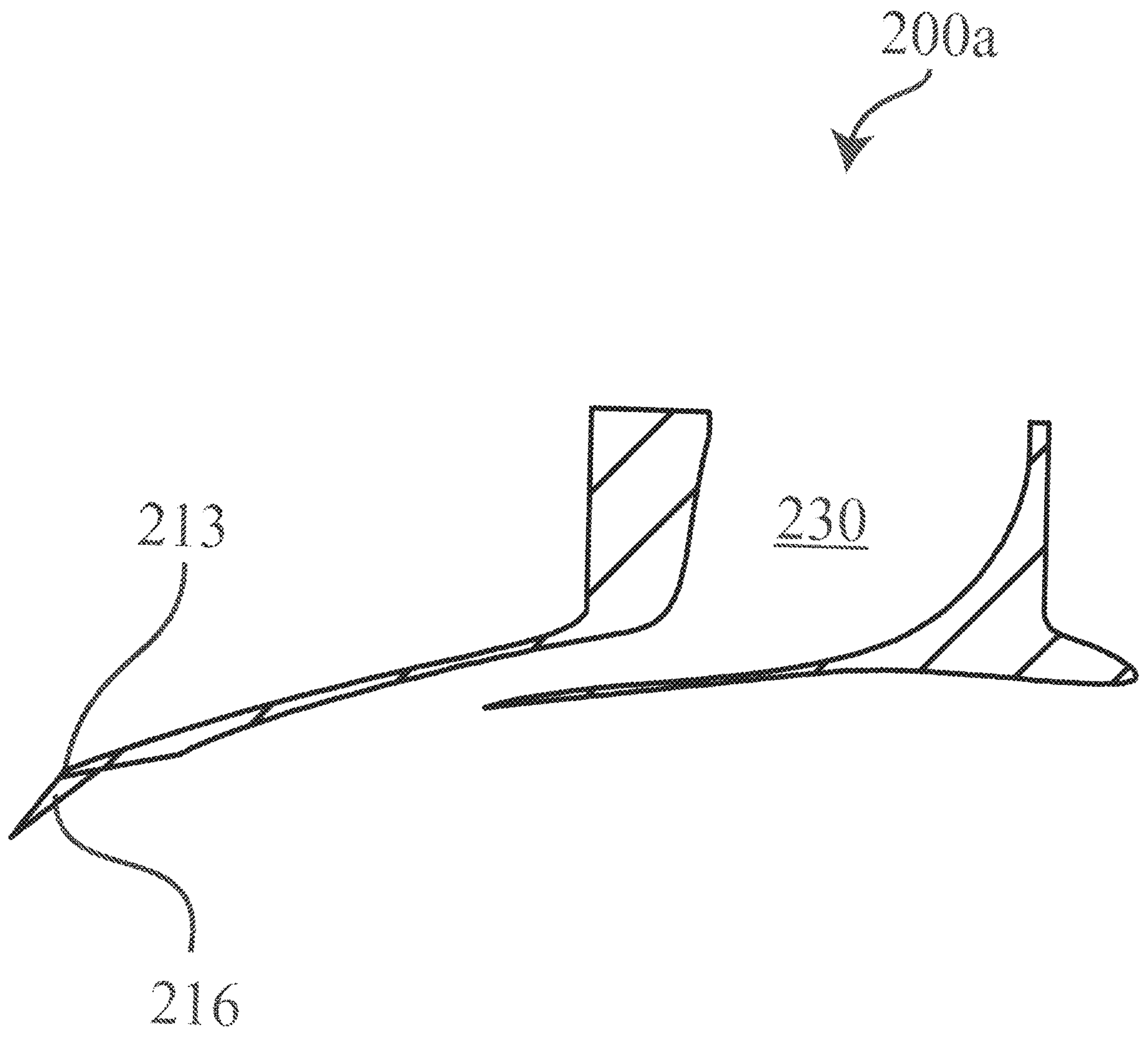
FIG. 15 illustrates a cross-sectional slice of the airfoil 200*a*.

Without wishing to be bound by theory, it is believed that at higher forward velocities, fluid delivered to the concave region 225 by the channel 230 can increase the velocity of air moving under the lower surface 220, such that lift is reduced (generally applicable to the airfoils disclosed herein). One option to address this phenomenon is to reduce fluid flow through the channel 230 at higher forward velocities. Another option is to reduce the speed of the fluid travelling under the lower surface 220. FIGS. 14 and 15 illustrate a variation of the airfoil 200, airfoil 200*a* with an adjustable flap 216 operably connected to the trailing edge 213. FIG. 14 illustrates a perspective view of the airfoil 200*a* with the flap 216 downward oriented. FIG. 15 illustrates a cross-sectional slice of the airfoil 200*a*.

The concept of the flap 216 can be used with any of the airfoils disclosed herein.

In certain scenarios, air may separate from the upper surface 210, causing a reduction in lift. Even if air is not separating from the upper surface 210, it may be beneficial to increase the speed of the air flowing over the upper surface 210 to thereby reduce the pressure and increase the lift.

Figure 16:
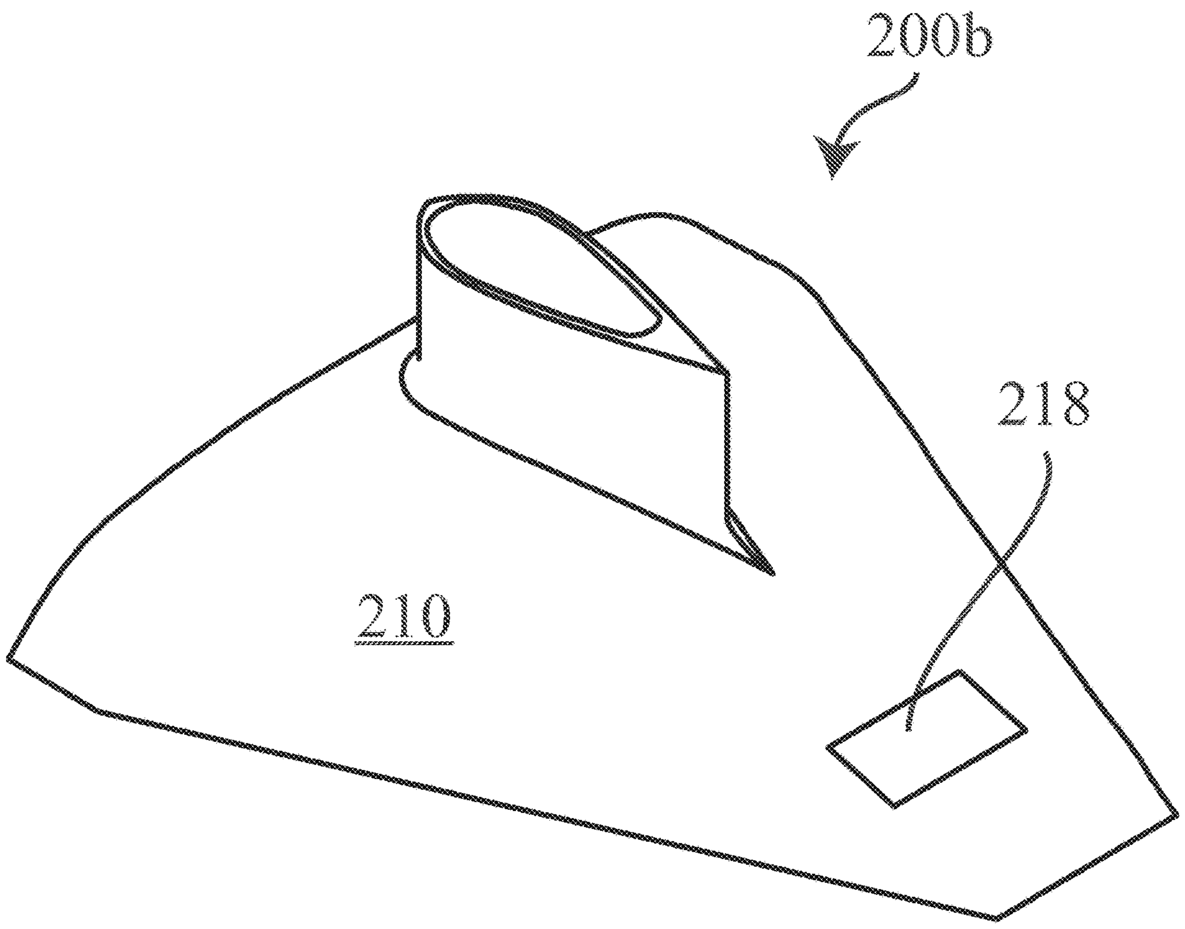
FIG. 16 illustrates a perspective view of one embodiment of an airfoil disclosed herein, airfoil 200*b*.
Figure 17:
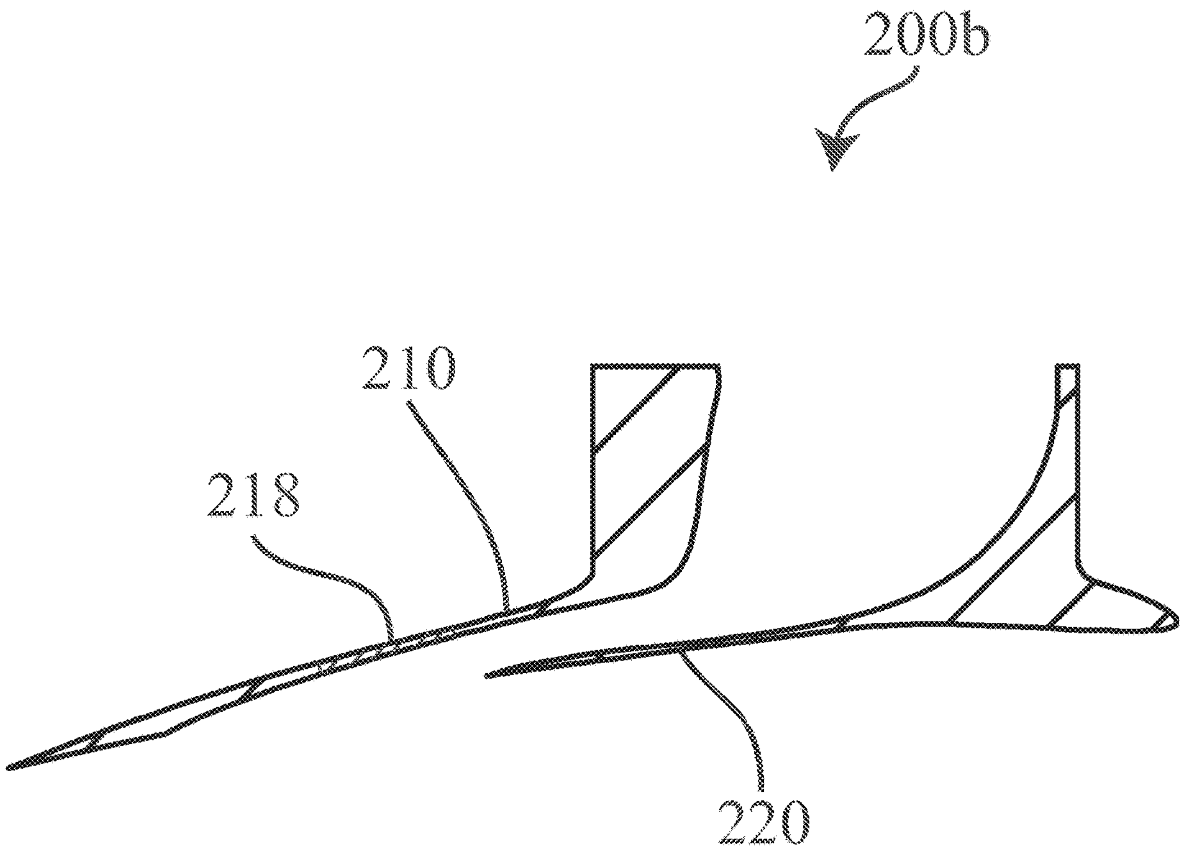
FIG. 17 illustrates a cross-sectional slice of the airfoil 200*b* with the vent 219 closed by the flap 218, taken along the lateral centerline of the airfoil 200*b*.
Figure 18:
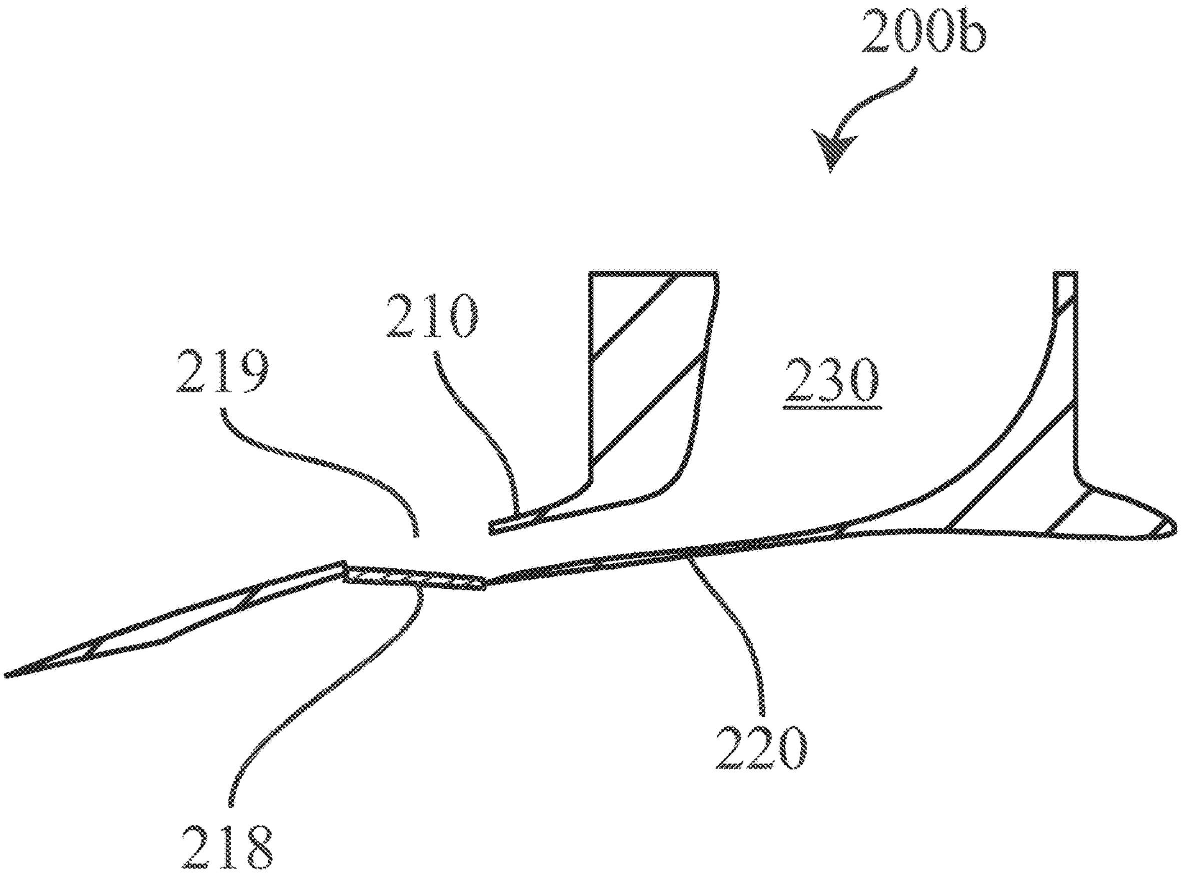
FIG. 18 illustrates a cross-sectional slice of the airfoil 200*b* with the vent 219 open, taken along the lateral centerline of the airfoil 200*b*.

FIGS. 16-18 illustrate a variation of the airfoil 200, airfoil 200*b* with an adjustable flap 218 and a vent 219. FIG. 16 illustrates a perspective view of one embodiment of an airfoil disclosed herein, airfoil 200*b*. FIG. 17 illustrates a cross-sectional slice of the airfoil 200*b* with the vent 219 closed by the flap 218, taken along the centerline of the airfoil 200*b*. FIG. 18 illustrates a cross-sectional slice of the airfoil 200*b* with the vent 219 open, taken along the centerline of the airfoil 200*b*. With the vent 219 open, fluid blown through the channel 230 is at least partially redirected out the vent 219 and over the upper surface 210.

The concept of the vent 219 may be implemented a number of different ways, such as multiple vents 219 located in the upper surface 210. Additionally, the flap 218 may only open outward, without occluding fluid flow in the channel 230. Alternatively, the vent 219 could penetrate entirely through the airfoil 200, forming a separate channel from the lower surface 220 to the upper surface 210 without fluidically connecting with the channel 230. In that configuration, air present near the lower surface 220 could travel through the vent 219 and over the upper surface 210 (such as over the trailing portion of the upper surface 210), aiding in lift.

The concept of the vent 219 may be applied to any of the airfoil embodiments disclosed herein.

Figure 19:
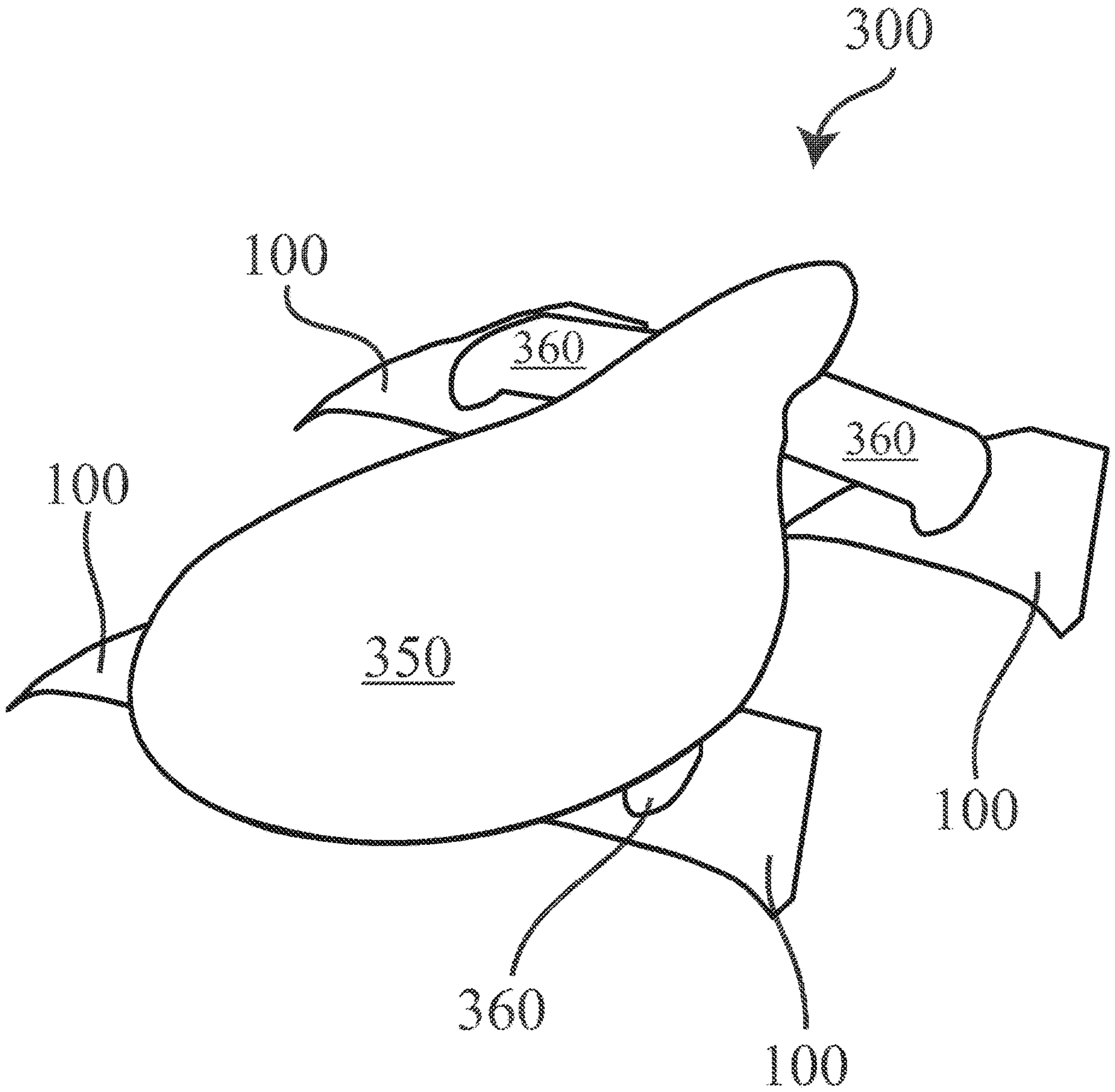
FIG. 19 illustrates a perspective view from above of one embodiment of a vehicle disclosed herein, vehicle 300.
Figure 20:
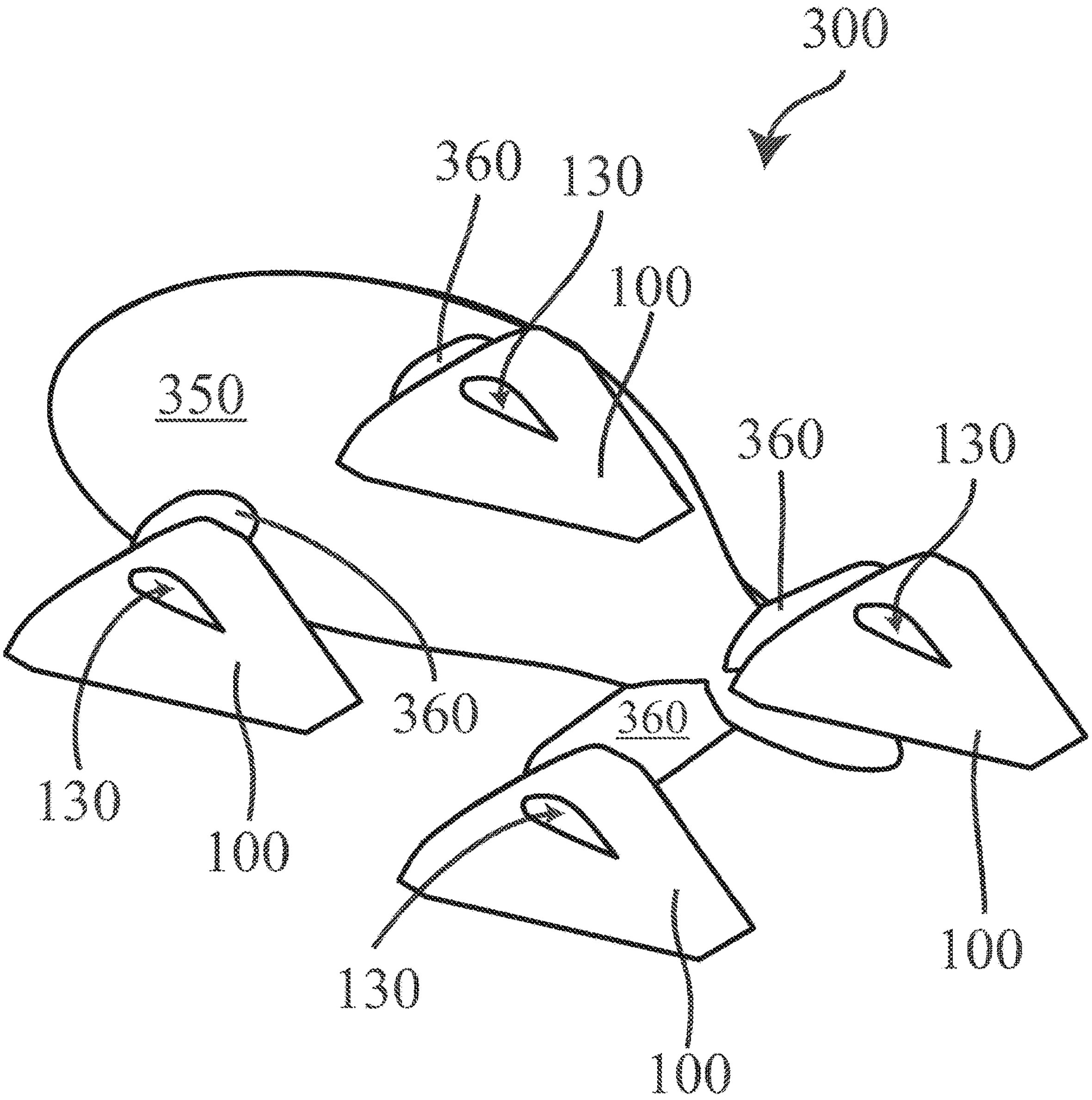
FIG. 20 illustrates an underneath perspective view of the vehicle 300 from below.

FIGS. 19-23 illustrate non-limiting generalized embodiments of vehicles incorporating the airfoil 100. FIG. 19 illustrates a perspective view of a vehicle 300 from above. FIG. 20 illustrates a perspective view of a vehicle 300 from below. The vehicle 300 includes an airframe 350 operatively connected to one or more blowers (not shown). The vehicle 300 includes four airfoils 100, two in the front and two in the back. Each airfoil 100 is rigidly secured to the airframe 350 via an aerotube 360 in fluidic communication with the one or more blowers (not shown) and with the channel 130 of each airfoil 100. Fluid supplied by the one or more blowers is blown through the channels 130, providing lift and allowing the vehicle 300 to hover. Forward propulsion provides forward movement for the vehicle 300.

Vehicle 300 could be configured for manned or unmanned operation. The vehicle 300 may be sized to accommodate a single pilot, two pilots, numerous passengers, relatively small cargo, palletized cargo, containerized cargo, or combinations of the foregoing.

Figure 21:
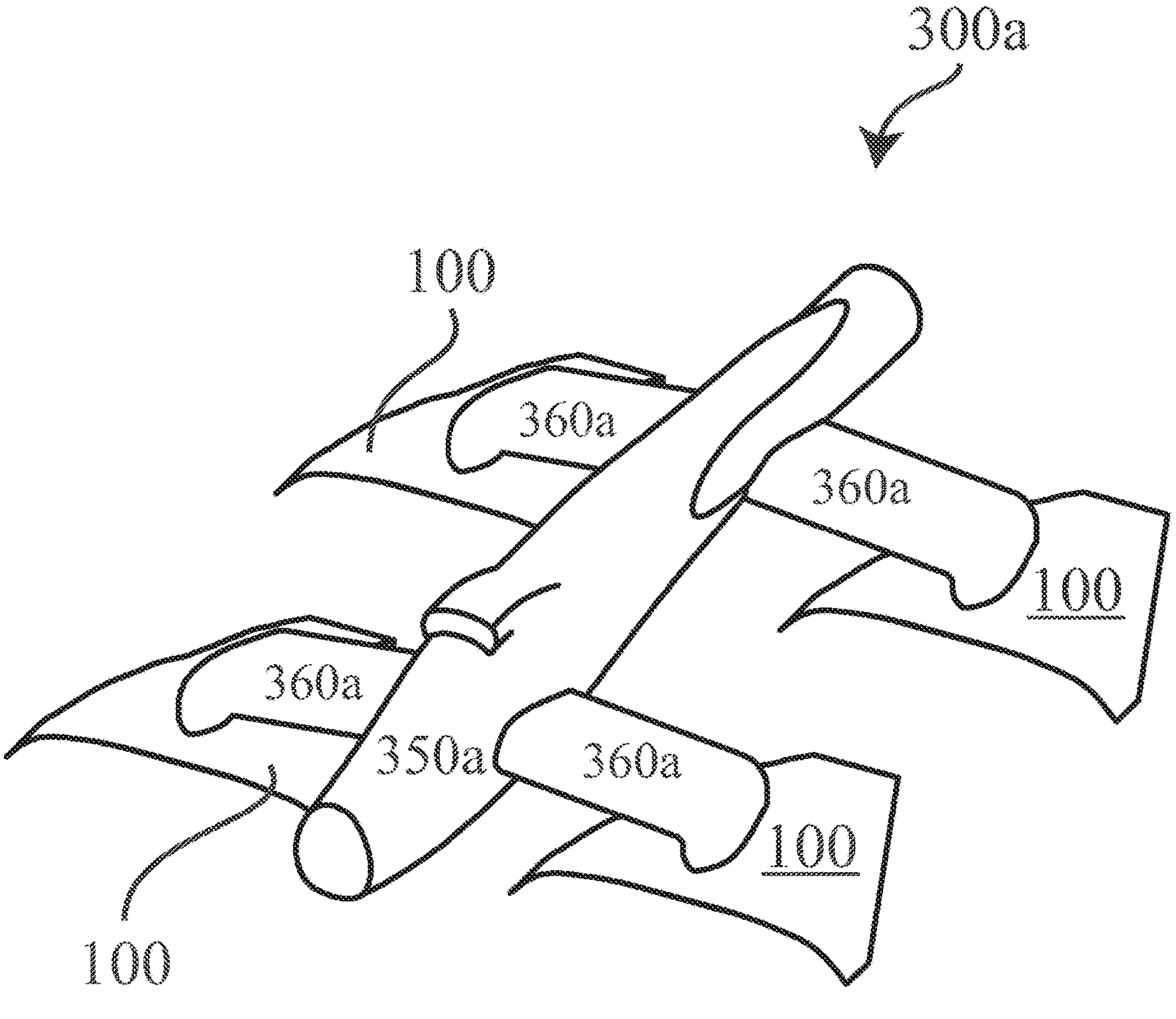
FIG. 21 illustrates a perspective view from above of another embodiment of a vehicle disclosed herein, vehicle 300*a*.
Figure 22:
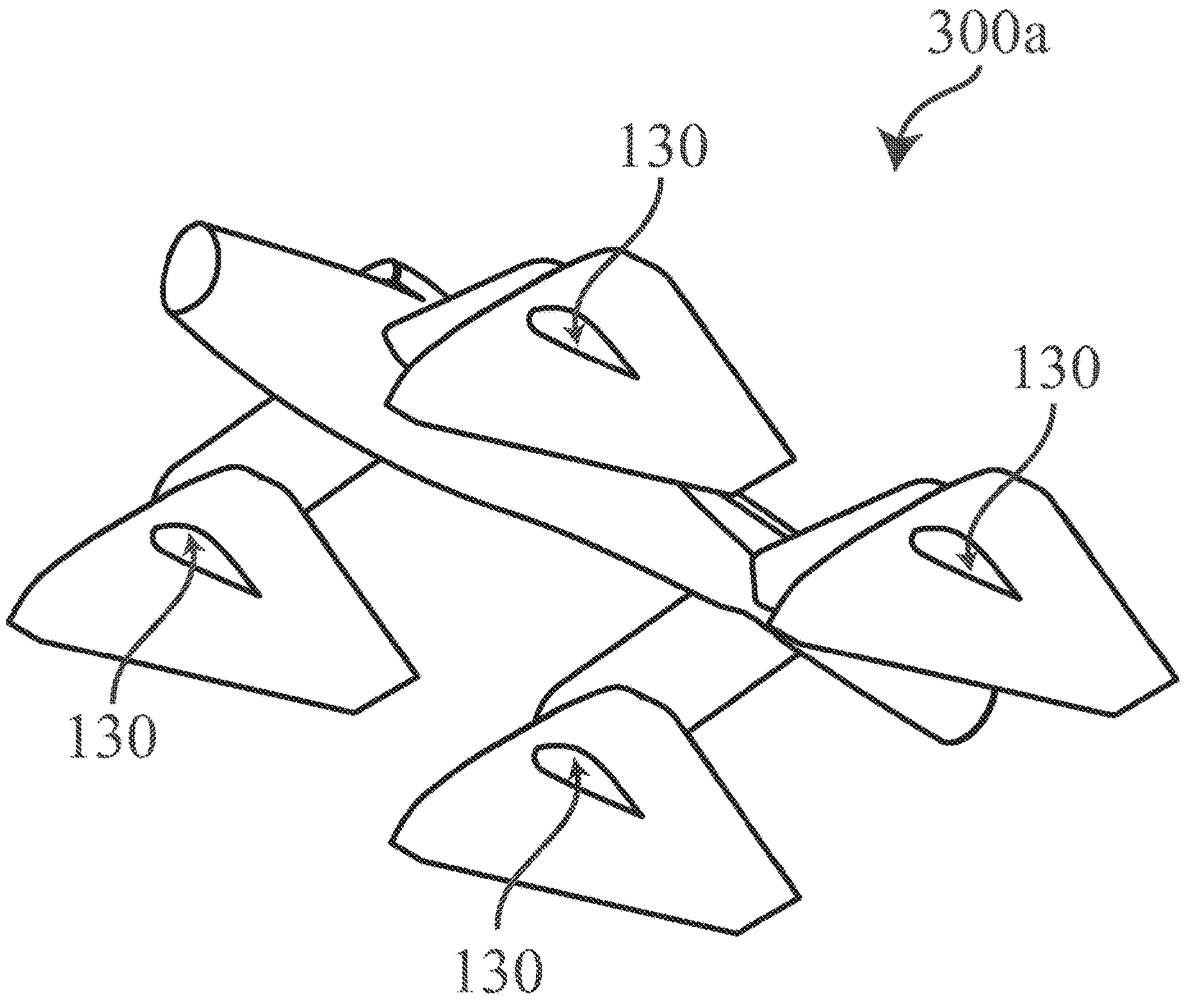
FIG. 22 illustrates an underneath perspective view of the vehicle 300*a*.
Figure 23:
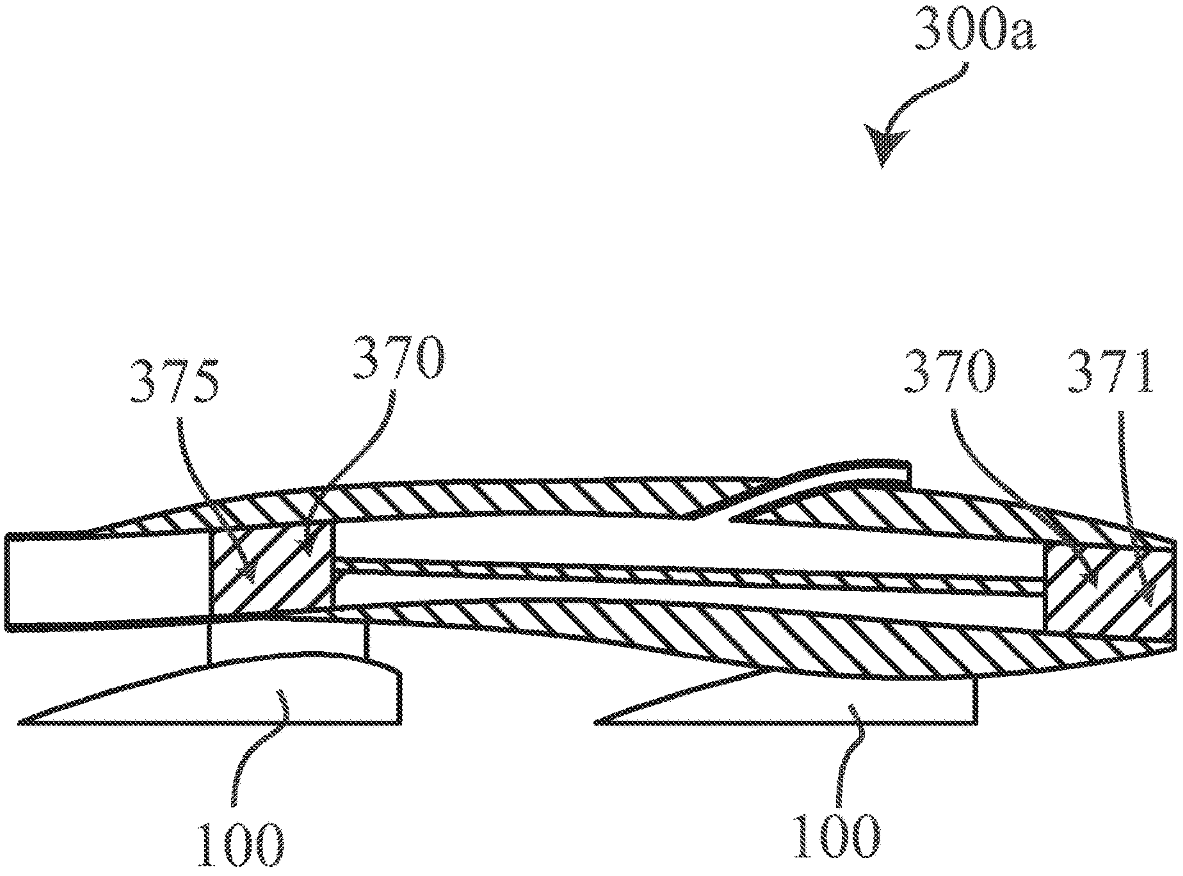
FIG. 23 illustrates a cross-sectional side view of the vehicle 300*a* taken along the lateral centerline.

FIG. 21 illustrates a perspective view of a vehicle 300*a* from above. FIG. 22 illustrates a perspective view of a vehicle 300*a* from below. FIG. 23 illustrates a cross-sectional side view of the vehicle 300*a* taken along the centerline. The vehicle 300*a* includes four airfoils 100, two in the front and two in the back. Each airfoil 100 is rigidly secured to the airframe 350*a* via an aerotube 360*a* in fluidic communication with the blowers 370 and with the channel 130 of each airfoil 100. In this embodiment, the blowers 370 include a fan 371 mechanically driven by a jet turbine 375. Atmospheric air is drawn into the fan 371 and directed via the front two aerotubes 360*a* to the channels 130 of the adjacent front two airfoils 100. The fan 371 is driven by a shaft powered by the jet turbine 375. Atmospheric air and fuel are applied to the jet turbine 375. The jet turbine 375 includes a compressor (not separately illustrated). The compressor compresses the exhaust from the jet turbine 375 and is operably connected to the rear aerotubes 360*a* and rear two channels 130 of the rear airfoils 100. The compressed exhaust is directed through the channels 130. The air and exhaust supplied to the channels 130 provide lift, allowing the vehicle 300*a* to hover. The jet turbine 375 also provides propulsion for forward motion of the vehicle 300*a*.

The air supplied by the fan 371 through the forward channels 130 can be varied or entirely eliminated or closed off. Likewise, the exhaust supplied by the turbine 371 through the rear channels 130 can be varied and redirected, such as to aid forward propulsion.

A benefit of the design of the vehicle 300*a* is that a single propulsion system is used to provide both hover and forward motion. This can provide weight-to-thrust ratio benefits over designs that use separate hover and flight power systems (e.g., separate rotors for take-off and flight) or that require bulky equipment to rotate power equipment from hover mode to flight mode (e.g., motors for rotating rotors from take-off/landing mode to flight mode).

The propulsion system of vehicle 300*a* can also be used with vehicle 300.

The vehicle 300*a* can be sized to be ridden like a motorcycle or ATV. The controls, windshield, seats, etc. are not illustrated. The vehicle 300*a* can also be enlarged to accommodate one or more passengers, cargo, or both within the airframe 350*a*. As with the vehicle 300, the vehicle 300*a* can be configured for manned or unmanned operation.

A variety of power supplies could be used. For example, instead of jet fuel, the jet turbine could be electrically driven or hydrogen or natural gas powered. Hydrogen fuel cells or batteries could be used to provide electricity to electric motors.

A horizontal fan, such as a central centrifugal fan, could be used to supply airflow to the various airfoils 100. In that embodiment, a separate forward propulsion system would be required, such as externally-mounted rotors or turbines. For example, a drone could include a central compartment for storage of cargo. The central fan could be mounted above the central compartment and the airfoils mounted outside the central compartment. Likewise, a large-scale version of such a drone could be used to transport passengers (such as passengers waiting at a bus stop in a transparent cubical container) or shipping containers. Externally-mounted rotors or turbines could be used with any of the embodiments disclosed herein.

A vehicle utilizing the airfoils could be an exosuit worn by a single individual. For example, a mechanized exosuit could provide the airframe (e.g., a support framework along the arms, legs, and torso with mechanized joints) for supporting the airfoils, blowers, and power supply. A central fan or jet turbine could supply air or exhaust to airfoils mounted at the hands and feet (e.g., one airfoil for each hand and each foot).

In the illustrated vehicle embodiments, two airfoils are fluidically connected to a single blower 370 (e.g., fan 371 or jet turbine 375). In other embodiments a separate blower may be operably connected to each airfoil. Each airfoil could be structurally connected to the other airfoils, such as via a frame. However, individual airfoils could also be individually mounted to an object to be transported. For example, a storage container as it is being offloaded from a transport ship could be outfitted with temporary airfoils that each have their own blower and power supply (for example, a magnetic L-shaped bracket could secure the airfoil to a bottom edge of a steel shipping container). Separate power supplies and forward propulsion fans could also be magnetically attached to the shipping container. The shipping container could then be flown in ground effect over the water from the transport ship (anchored a distance from the port) to the port. The shipping container could potentially be flown/hovered directly to a distribution center.

In the illustrated vehicle embodiments, the airfoils are fixed to a vehicle. Optionally, the airfoils can be articulatable. For example, the angle of attack during takeoff could be adjusted. Additionally, the lateral angles of individual or all of the airfoils could be adjusted to aid in steering a vehicle. The ability to freely pivot each airfoil from its upper surface (such as at the connection point to the blowers) may provide enhanced maneuverability when flying in ground effect, as compared to mono-wing-type ground effect vehicles.

Vehicles utilizing the airfoils disclosed herein may have improved stability in ground effect compared to conventional ground effect vehicles. Having multiple airfoils may stabilize vehicles, as compared to a single airfoil.

The airfoils disclosed herein may be made of any material sufficiently strong and lightweight, such as fiberglass, carbon fiber, titanium, and/or aluminum. The upper and lower surfaces may be rigid. Alternatively, the upper and lower surfaces may have flexible regions. For example, at sufficient speeds, it may be desirable to change the shape of the airfoil to achieve a more conventional wing shape. The laterally arcuate shape of airfoil could be modulated with a piston and rod attached to the upper surface of the shroud, on each side lateral to the channel. As the pistons contract, the lateral concavity of the airfoil could be reduced. Additionally, the angle of attack of the airfoil could be adjusted by actuators operatively coupled to the airfoil and the airframe.

Vehicles including the airfoils disclosed herein could also include conventional wings. The conventional wings could be permanently extended from the airframe or could be selectably deployable. Deployment of the wings could occur by extension of retracted wing portions or by lowering wings kept in a vertical position.

Furthermore, the airfoils disclosed herein could function as landing gear, so to speak. Fluid could be blown through the channels of the airfoils during take-off, acceleration, deceleration, and landing. During flight, fluid flow through the channels could be blocked or directed to forward propulsion. The airfoils connections to the airframe could be designed to retract the airfoils within the airframe or rotate the airfoils up against the fuselage of the airframe.

Computer modeling and prototype experiments were performed using airfoil 200. The total mass of the proposed vehicle (a hoverbike) and rider was assumed to be 272 kg (600 lb.). Assuming three airfoils (one in the front and two in the rear), the lift force needed for hovering was at least 890 N per airfoil. The individual airfoils were sized to provide 1 square meter of lower surface area, for case of calculations. Computational fluid dynamics modelling was performed using SolidWorks. 11 different heights, 6 different nozzle flow velocities, and 5 different forward velocities were tested. The results are depicted in FIGS. 24-26.

Figure 24:
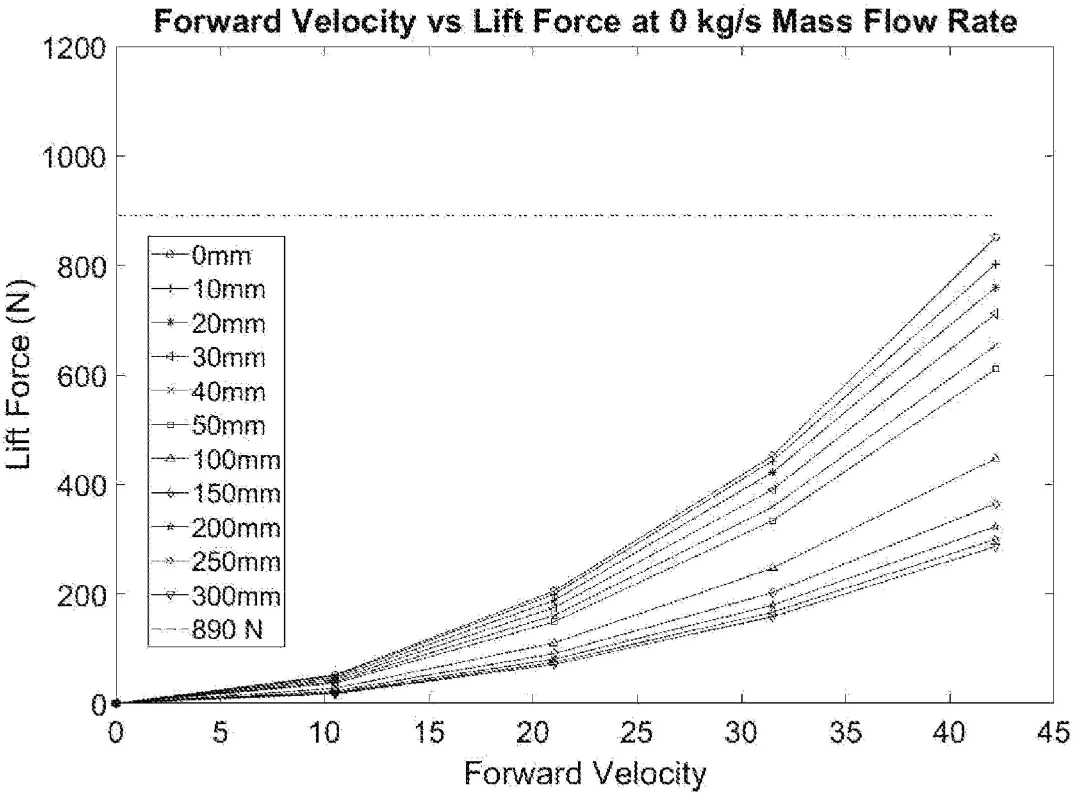
FIG. 24 depicts a plot comparing lift generated as forward velocity increases at various heights off the ground with no air pushed through the channel, which simulates forward velocity, for the airfoil 200.

FIG. 24 depicts a plot comparing lift generated as forward velocity increases at various heights off the ground with no air pushed through the channel, which simulates forward velocity. The dashed line represents the required 890 N of lift force theorized to achieve hover.

Figure 25:
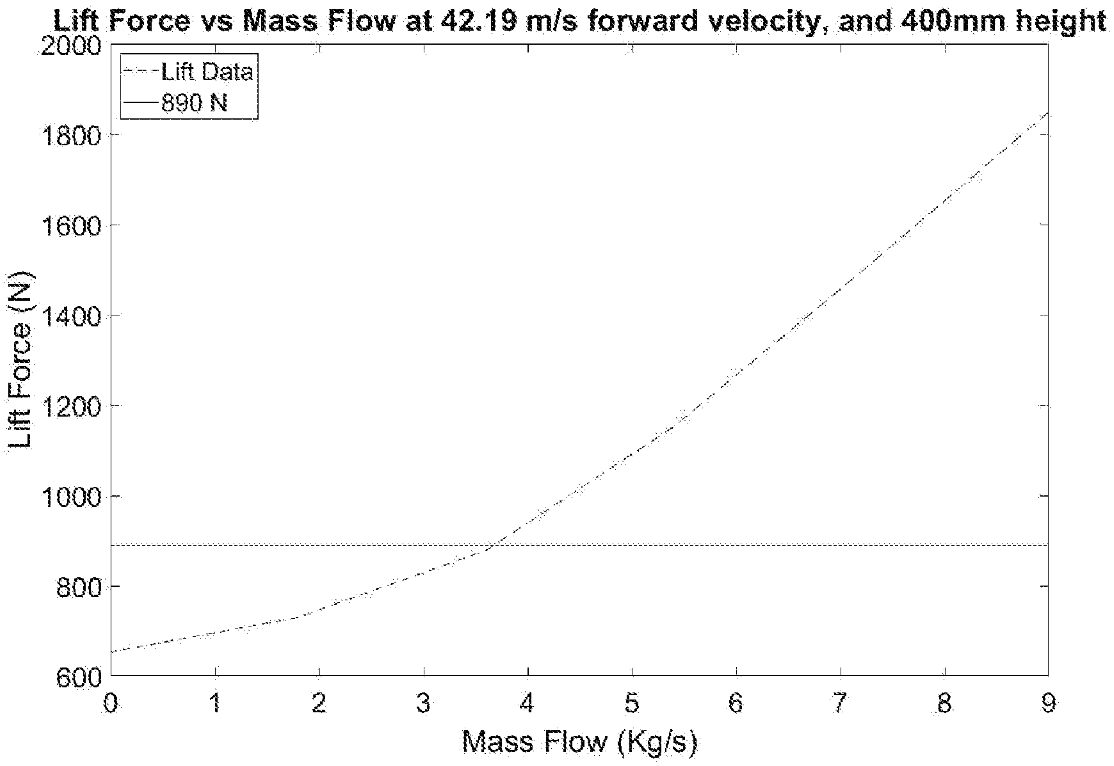
FIG. 25 depicts a plot showing lift force as a function of mass flow through the channel for the airfoil 200.

FIG. 25 depicts a plot showing lift force as a function of mass flow through the channel. The forward velocity was set at 42.19 mis and the height at 400 mm. This plot shows the increase in lift force as the mass flow increases. The solid horizontal line represents the 890 N of lift force needed to create hover for the presumed weight.

In certain flow regimes (i.e., a combination of channel flow and forward velocity), the lift force was reduced or even turned negative. It was believed this was due to air moving faster beneath the airfoil than above, causing a low-pressure region below the airfoil.

A $117^{th}$ scale model of the 1 $m^2$ airfoil 200 design without the channel was 3D printed and tested in a small wind tunnel at the 3 highest speeds the wind tunnel could perform for angles of attack between 0-20 degrees (relative to the angle of attack of the first and second arcuate wingtips).

Pitot Tubes and a force sensor were used to obtain the data shown in FIG. 26. Three different speeds and six different angles of attack were tested to try and determine if there was a Reynolds number dependance as well as a dependance on angle of attack. Once data was recorded, the different tests were replicated in Solidworks, and CFO simulations were performed. As shown in the table, the difference between actual and simulation results was quite low, which leads to the conclusion that the simulation results were not only accurate, but slightly conservative.

Figure 27:
FIG. 27 depicts the wind tunnel setup and 3D-printed model.

FIG. 27 depicts the wind tunnel setup and 3D-printed model. Due to testing constraints, the airfoil was mounted upside down and no channel flow was applied. [0099] As discussed above, it was determined that in certain flow regimes, the pressure beneath the airfoil was decreased because of fast air moving beneath it. A flap was added at the rear of the foil (see FIGS. 14 and 15 and airfoil 200*a*) and computational fluid dynamics testing performed.

Figure 28:
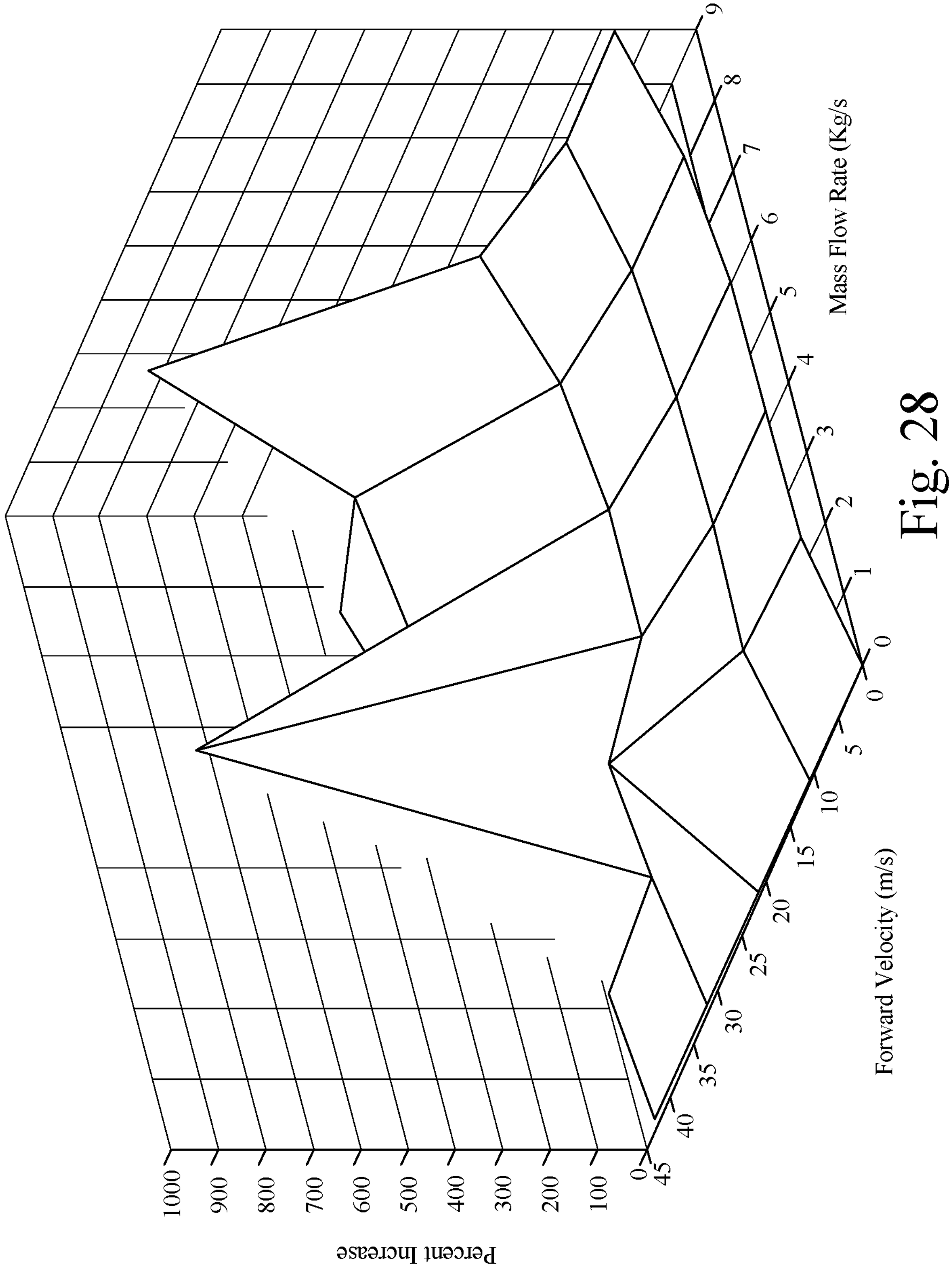
FIG. 28 depicts the CFO-determined percent increase in lift between two different embodiments of the airfoils disclosed herein at one height above a surface.
Figure 29:
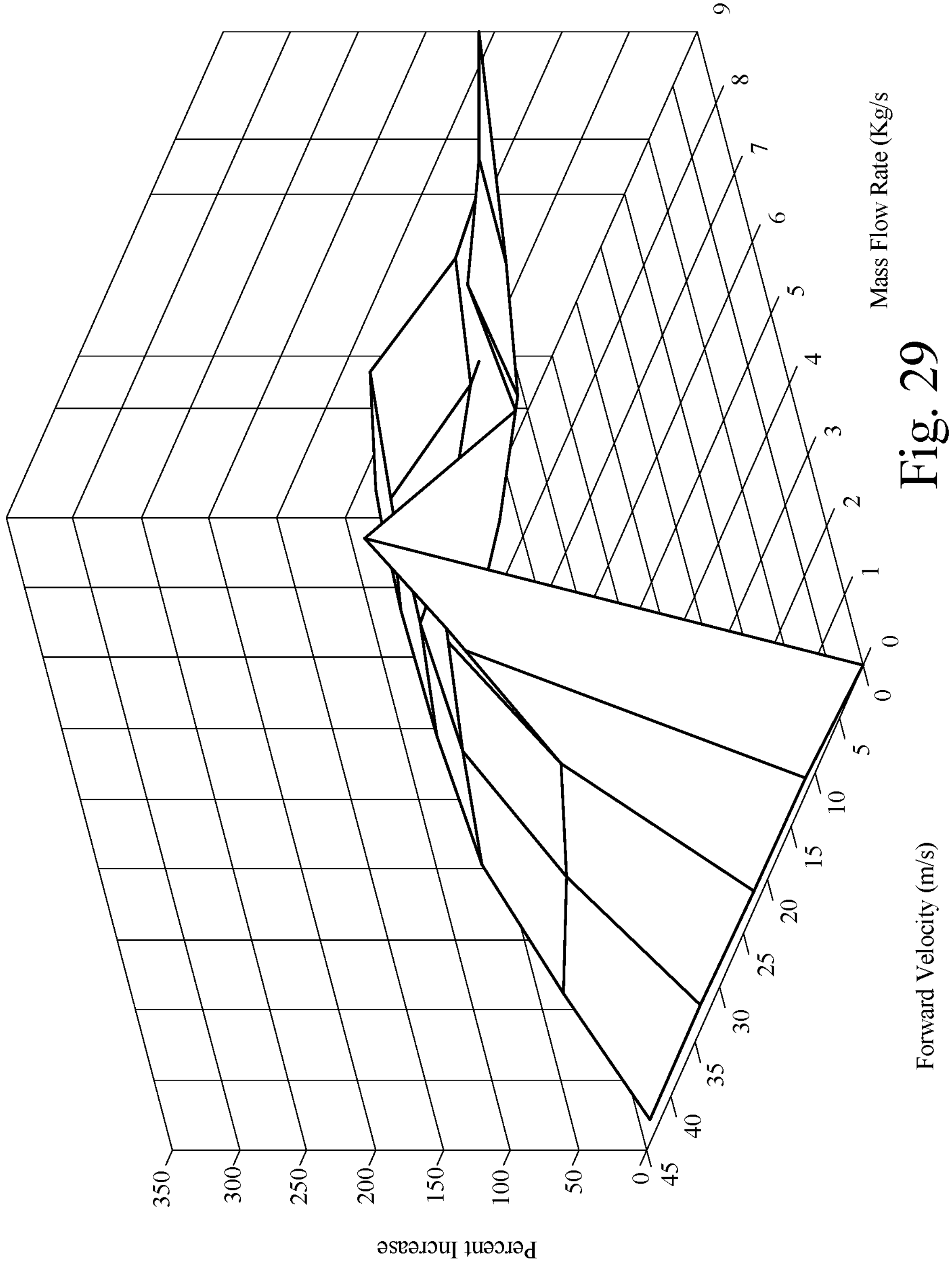
FIG. 29 depicts the CFO-determined percent increase in lift between two different embodiments of the airfoils disclosed herein at a second height above a surface.

The goal for the flap was to redirect the air coming out of the channel downwards, thus slowing down the air and using the change in momentum to create additional lift. The two plots shown in FIGS. 28 and 29 represent the percent increase in lift between the original results and the results obtained with the flap.

When above certain elevations, (see FIG. 28) the most increase occurs at the higher forward velocities and the higher mass flow rates. Closer to the ground, the results were more consistent, but had a spike at 2 kg/sand no forward velocity.

EXAMPLES

A vehicle comprising: an airframe operatively connected to one or more blowers; and multiple airfoils, wherein each airfoil comprises an upper surface and a lower surface extending laterally to first and second arcuate wingtips defining a concave region bounded by the lower surface of the airfoil, wherein each airfoil is operatively connected to the airframe via the upper surface of each airfoil, wherein each airfoil comprises a channel extending from the upper surface to the lower surface of the airfoil, wherein the channel is in fluidic communication with at least one of the one or more blowers.

The vehicle of paragraph [0074], wherein fluid provided by the one or more blowers into the channels of each of the multiple airfoils generates lift for the vehicle.

The vehicle of paragraph [0074] or paragraph [0075], wherein each airfoil further comprising a nozzle extending downward from the lower surface of the airfoil in fluidic communication with the channel of the airfoil.

The vehicle of paragraph [0076], wherein the nozzle for each airfoil is extendable and retractable. The vehicle of any one of paragraphs [0074]-[0076], wherein the channel of each airfoil channel comprises a straight tube.

The vehicle of any one of paragraphs [0074]-[0077], wherein the channel of each airfoil channel comprises a swept tube wherein a lower orifice of the channel is offset relative to an upper orifice of the channel.

The vehicle of any one of paragraphs [0074]-[0078], wherein each airfoil includes a selectively openable vent located in the upper surface of the airfoil and rearward of an upper orifice of the channel and wherein the vent is in fluidic communication with the channel, whereby when the vent is in an open position, fluid provided by the one or more blowers into the channels exits at least partially through the vent and over the upper surface of the airfoil and thereby generates lift for the vehicle.

The vehicle of any one of paragraphs [0074]-[0079], wherein a centerline of each airfoil has a stationary angle of attack of 5° to 25°, of 5° to 20°, of 5° to 15°, of 10° to 20°, or of 10° to 15°; OPTIONALLY, wherein the first and second arcuate wingtips have a stationary angle of attack of zero.

The vehicle of any one of paragraphs [0074]-[0080], wherein each airfoil is articulatable.

The vehicle of any one of paragraphs [0074]-[0080], wherein each airfoil is rigidly secured to the airframe via an aerotube in fluidic communication with the one or more blowers and with the channel of the airfoil.

The vehicle of any one of paragraphs [0074]-[0082], wherein one or two airfoils of the multiple airfoils are operatively connected to a single blower and one or two airfoils of the multiple airfoils are operatively connected to a second single blower.

The vehicle of any one of paragraphs [0074]-[0083], further comprising one or more turbines operatively connected to the one or more blowers.

The vehicle of any one of paragraphs [0074]-[0084], wherein materials making up the upper surface and the lower surface comprise rigid materials.

The vehicle of any one of paragraphs [0075]-[0085], wherein a lateral concavity of the concave region can be increased or decreased.

An airfoil comprising an upper surface and a lower surface extending laterally to first and second arcuate wingtips defining a concave region bounded by the lower surface of the airfoil, the airfoil configured for operative connection to an airframe via the upper surface of the airfoil, the airfoil comprising a channel extending through the upper surface and the lower surface of the airfoil, wherein an upper orifice of the channel is configured for fluidic communication with one or more blowers.

The airfoil of paragraph [0087], further comprising a nozzle extending downward from the lower surface of the airfoil in fluidic communication with the channel of the airfoil; OPTIONALLY, wherein the nozzle is extendable and retractable.

The airfoil of any one of paragraphs [0087]-[0088], wherein the channel comprises a straight tube.

The airfoil of any one of paragraphs [0087]-[0088], wherein the channel comprises a swept tube wherein a lower orifice of the channel is offset relative to an upper orifice of the channel.

The airfoil of any one of paragraphs [0087]-[0090], wherein the airfoil includes a selectively openable vent located in the upper surface of the airfoil and rearward of an upper orifice of the channel and wherein the vent is in fluidic communication with the channel, whereby when the vent is in an open position, fluid provided into the channels exits at least partially through the vent and over the upper surface of the airfoil.

The airfoil of any one of paragraphs [0087]-[0091], wherein a centerline of the airfoil has a stationary angle of attack of 5° to 25°, of 5° to 20°, of 5° to 15°, of 10° to 20°, or of 10° to 15°; OPTIONALLY, wherein the first and second arcuate wingtips have a stationary angle of attack of zero.

The airfoil of any one of paragraphs [0087]-[0092], wherein materials making up the upper surface and the lower surface comprise rigid materials.

The airfoil of any one of paragraphs [0087]-[0093], wherein a lateral concavity of the concave region can be increased or decreased.

An airfoil comprising an upper surface and a lower surface and configured for operative connection to an airframe via the upper surface of the airfoil, the airfoil comprising a channel extending from the upper surface to the lower surface of the airfoil, wherein the channel is configured for fluidic communication with one or more blowers, and comprising a nozzle extending downward from the lower surface of the airfoil in fluidic communication with the channel of the airfoil.

The airfoil of paragraph [0095], wherein the upper surface and the lower surface extend laterally to first and second arcuate wingtips defining a concave region bounded by the lower surface of the airfoil.

The airfoil of paragraph [0095] or paragraph [0096], wherein the nozzle is extendable and retractable.

The airfoil of any one of paragraphs [0095]-[0097], wherein the channel comprises a straight tube.

The airfoil of any one of paragraphs [0095]-[0097], wherein the channel comprises a swept tube wherein a lower orifice of the channel is offset relative to an upper orifice of the channel.

The airfoil of any one of paragraphs [0095]-[0098], wherein the airfoil includes a selectively openable vent located in the upper surface of the airfoil and rearward of an upper orifice of the channel and wherein the vent is in fluidic communication with the channel, whereby when the vent is in an open position, fluid provided into the channels exits at least partially through the vent and over the upper surface of the airfoil.

The airfoil of any one of paragraphs [0095]-[0100], wherein a centerline of the airfoil has a stationary angle of attack of 5° to 25°, of 5° to 20°, of 5° to 15°, of 10° to 20°, or of 10° to 15°; OPTIONALLY, wherein the first and second arcuate wingtips have a stationary angle of attack of zero.

The airfoil of any one of paragraphs [0095]-[0101], wherein materials making up the upper surface and the lower surface comprise rigid materials. [0103] The airfoil of any one of paragraphs [0095]-[0102], wherein a lateral concavity of the concave region can be increased or decreased.

It will be apparent to those having skill in the art that many changes may be made to the details of the above-described embodiments without departing from the underlying principles of the invention.

What is claimed is:

1. A vehicle comprising:

an airframe operatively connected to one or more blowers;

a plurality of airfoils, wherein:

each airfoil comprises a leading edge, a trailing edge, an upper surface and a lower surface extending laterally to first and second arcuate wingtips defining a concave region bounded by the lower surface of the airfoil;

each airfoil is operatively connected to the airframe via the upper surface of each airfoil;

each airfoil comprises a channel extending from the upper surface to the lower surface of the airfoil;

the channel is in fluidic communication with at least one of the one or more blowers;

each airfoil is rigidly secured to the airframe via an aerotube in fluidic communication with the one or more blowers and with the channel of the airfoil; and the leading edge is longer than the trailing edge.

2. The vehicle of claim 1, wherein:

the vehicle further comprises a fuselage; and the plurality of airfoils are disposed below the fuselage.

3. The vehicle of claim 1, wherein:

the leading edge has a central section portion a first distance above the arcuate wingtips;

the trailing edge has a central portion a second distance above the arcuate wingtips; and the first distance is greater than the second distance.

4. The vehicle of claim 1, wherein the trailing edge intersects the same horizontal plane as the arcuate wingtips.

5. The vehicle of claim 1, wherein fluid provided by the one or more blowers into the channels of each of the multiple airfoils generates lift for the vehicle.

6. The vehicle of claim 1, wherein the channel of each airfoil channel comprises a swept tube wherein a lower orifice of the channel is offset relative to an upper orifice of the channel.

7. The vehicle of claim 1, wherein each airfoil includes a selectively openable vent located in the upper surface of the airfoil and rearward of an upper orifice of the channel and wherein the vent is in fluidic communication with the channel, whereby when the vent is in an open position, fluid provided by the one or more blowers into the channels exits at least partially through the vent and over the upper surface of the airfoil and thereby generates lift for the vehicle.

8. The vehicle of claim 1, wherein a centerline of each airfoil has a stationary angle of attack of 5° to 25°, of 5° to 20°, of 5° to 15°, of 10° to 20°, or of 10° to 15°.

9. The vehicle of claim 1, wherein each airfoil is articulatable.

10. The vehicle of claim 1, wherein one or two airfoils of the multiple airfoils are operatively connected to a single blower and one or two airfoils of the multiple airfoils are operatively connected to a second single blower.

11. The vehicle of claim 1, further comprising one or more turbines operatively connected to the one or more blowers.

12. The vehicle of claim 1, wherein materials making up the upper surface and the lower surface comprise rigid materials.

13. The vehicle of claim 1, wherein a lateral concavity of the concave region can be increased or decreased.

14. The vehicle of claim 1, further comprises conventional wings extending from the airframe and distinct from the multiple airfoils.

15. The vehicle of claim 1, wherein each airfoil further comprising a nozzle extending downward from the lower surface of the airfoil in fluidic communication with the channel of the airfoil.

16. The vehicle of claim 15, wherein the nozzle for each airfoil is extendable and retractable.

17. The vehicle of claim 1, wherein the channel of each airfoil channel comprises a straight tube.

18. The vehicle of claim 17, wherein the first and second arcuate wingtips have a stationary angle of attack of zero.

19. An airfoil comprising a leading edge, a trailing edge an upper surface and a lower surface extending laterally to first and second arcuate wingtips defining a concave region bounded by the lower surface of the airfoil, the airfoil configured for operative connection to an airframe via the upper surface of the airfoil, the airfoil comprising a channel extending through the upper surface and the lower surface of the airfoil, wherein an upper orifice of the channel is configured for fluidic communication with one or more blowers and the leading edge is longer than the trailing edge, wherein the channel of each airfoil channel comprises a swept tube wherein a lower orifice of the channel is offset relative to an upper orifice of the channel.

* * * * *